(12) United States Patent
Takeda et al.

(10) Patent No.: US 11,632,026 B2
(45) Date of Patent: Apr. 18, 2023

(54) CORE UNIT MANUFACTURING METHOD

(71) Applicant: MITSUI HIGH-TEC, INC., Fukuoka (JP)

(72) Inventors: Yuji Takeda, Fukuoka (JP); Katsumi Amano, Fukuoka (JP); Takashi Fukumoto, Fukuoka (JP)

(73) Assignee: MITSUI HIGH-TEC, INC., Fukuoka (JP)

( * ) Notice: Subject to any disclaimer, the term of this patent is extended or adjusted under 35 U.S.C. 154(b) by 31 days.

(21) Appl. No.: 17/398,538

(22) Filed: Aug. 10, 2021

(65) Prior Publication Data
US 2022/0060094 A1 Feb. 24, 2022

(30) Foreign Application Priority Data
Aug. 19, 2020 (JP) .............................. JP2020-138947

(51) Int. Cl.
| | |
|---|---|
| *H02K 15/12* | (2006.01) |
| *H02K 1/276* | (2022.01) |
| *H02K 1/28* | (2006.01) |
| *H02K 15/03* | (2006.01) |
| *B29C 45/72* | (2006.01) |
| *B29C 45/03* | (2006.01) |
| *B29C 45/14* | (2006.01) |
| *B29K 705/00* | (2006.01) |
| *B29L 31/00* | (2006.01) |

(52) U.S. Cl.
CPC ............. *H02K 15/12* (2013.01); *B29C 45/03* (2013.01); *B29C 45/14008* (2013.01); *B29C 45/14467* (2013.01); *B29C 45/72* (2013.01); *H02K 1/276* (2013.01); *H02K 1/28* (2013.01); *H02K 15/03* (2013.01); *B29K 2705/00* (2013.01); *B29L 2031/7498* (2013.01); *Y10T 29/49009* (2015.01)

(58) Field of Classification Search
CPC .......... H02K 15/03; H02K 15/12; H02K 3/12; H02K 1/278; H02K 1/276; Y10T 29/49009; Y10T 29/49002; Y10T 29/49012; Y10T 29/53143
USPC ......... 29/596, 428, 598, 604, 607, 609, 729, 29/732, 738
See application file for complete search history.

(56) References Cited

U.S. PATENT DOCUMENTS 9,166,454 B2 * 10/2015 Chun ....................... H02K 3/00
11,277,059 B2 * 3/2022 Kimura .................. H02K 11/35

FOREIGN PATENT DOCUMENTS

JP 2012-235697 11/2012

* cited by examiner

*Primary Examiner* — Thiem D Phan
(74) *Attorney, Agent, or Firm* — Greenblum & Bernstein, P.L.C.

(57) ABSTRACT

There are provided a core unit manufacturing apparatus and a core unit manufacturing method including: a molding device that fills a resin into a space portion in a core body; a resin transfer unit that transfers a resin material to the molding device to supply the resin material thereto; and a core transfer unit that carries the core body in and out of a part between a pair of dies of the molding device. The resin transfer unit and the core transfer unit are arranged such that: the resin transfer unit supplies the resin to the molding device from one side position of side surfaces of the molding device; and the core transfer unit carries the core body in and out of the molding device from the other side position of the side surfaces of the molding device, the other side position being different from one side position.

8 Claims, 21 Drawing Sheets

CORE UNIT MANUFACTURING METHOD

CROSS-REFERENCE TO RELATED APPLICATIONS

This application is based on and claims priority under 35 USC 119 from Japanese Patent Application No. 2020-138947 filed on Aug. 19, 2020, the contents of which are incorporated herein by reference.

TECHNICAL FIELD

The present disclosure relates to a core unit manufacturing apparatus in a stator or a rotor of a rotating electric machine.

BACKGROUND ART

In a stator or a rotor of a rotating electric machine such as an electric motor or a generator, a laminated core is generally used for a core in which a coil and a permanent magnet is disposed.

In the related art, various efforts have been made to dispose a coil and a permanent magnet in the core of such laminated core.

For example, in a case of the core of the rotor, especially, in a case of a rotor core of an IPM motor, a structure in which magnets are inserted and fixed in magnet insertion holes of the laminated core has been adopted. In this structure, when fixing the permanent magnet, after inserting the permanent magnet into the magnet insertion hole, resin such as thermosetting resin in a melted and fluid state is injected into a space portion (gap) in the magnet insertion hole excluding a part where the permanent magnet exists to fill the space portion. After this, by fixing the resin, the permanent magnet is fixed.

One example of such core manufacturing in the rotating electric machine of the related art is disclosed in JP2012-235697A.

The core manufacturing of the rotating electric machine of the related art is a method described in JP2012-235697A, and it is necessary to carry a core body and a resin material for injection into a molding device (resin sealing device) that injects resin into the laminated core. For example, when the core body and the resin material are to be carried in and supplied from the same side of the molding device, the items can go in and out of the molding device at one location, and the structure of the molding device itself can be simplified. However, when one of the carrying-in mechanisms is operated, in order to make sure that other carrying-in mechanisms do not become an obstacle and have an adverse effect, a separate mechanism is required to temporarily retract the carrying-in mechanism out of a movable range, and each mechanism related to the carrying-in becomes complicated. At the same time, a step for retracting and returning the mechanism is also required, and there is a problem that it difficult to improve the manufacturing efficiency.

In a case where the molding device is a type in which the laminated core is carried in after the resin material is carried in, when carrying in the laminated core, a step is required to reliably retract the carrying-in mechanism of the resin material out of the movable range of the carrying-in mechanism on the laminated core side, and the laminated core cannot be set between the upper and lower dies of the molding device immediately after the resin material is carried in. Therefore, the time required to inject the heated and molten resin into the laminated core becomes longer, and with the passage of this time, not only does the fluidity of the molten resin decrease, but also the resin tends to solidify before injection and filling are completed. Accordingly, there is a problem that the quality of the resin that has filled the laminated core deteriorates or unfilled regions (voids) is generated.

SUMMARY OF INVENTION

The present disclosure provides a core unit manufacturing apparatus having a structure in which a resin material and a core body are carried into a molding device from two different directions respectively, and in which carrying-in mechanisms do not adversely affect each other, the complexity of the mechanisms can be avoided, and the manufacturing efficiency can be improved by appropriate carrying-in.

According to an aspect of the present disclosure, a core unit manufacturing apparatus for manufacturing a core unit of a stator or a rotor in a rotating electric machine, the core unit being formed by filling a resin into a space portion provided as a target for filling the resin in a core body formed by laminating a plurality of thin plates made of a magnetic metal material, includes: a molding device that fills the resin into the space portion in the core body; a resin transfer unit that transfers a resin material to the molding device to supply the resin material thereto; and a core transfer unit that carries the core body in and out of a part between a pair of dies of the molding device. The resin transfer unit and the core transfer unit are arranged such that: the resin transfer unit supplies the resin to the molding device from one side position of side surfaces of the molding device; and the core transfer unit carries the core body in and out of the molding device from the other side position of the side surfaces of the molding device, the other side position being different from one side position.

According to the present disclosure, the core transfer unit that carries in and out the core body and the resin transfer unit that transfers and supplies the resin material carry the core body in and out the molding device and supply the resin respectively from different directions, to the molding device that fills the space portion, which is a resin filling target of the core body in the rotating electric machine, with resin, and fill the space portion of the core body with the resin using the molding device. Accordingly, each movement path of the core body and the resin material to the molding device can be simplified, the structure of the molding device or each transfer unit does not need to be complicated, the manufacturing cost can be suppressed, and the maintainability can be improved.

According to another aspect of the present disclosure, the molding device may be configured to: melt the resin material to form the resin; and fill the space portion with the molten resin.

According to the present disclosure, the molten resin is injected into the space portion of the core body using the molding device in which the core body is carried in and out by the core transfer unit and the resin material is transferred and supplied by the resin transfer unit from different directions. Accordingly, the movement paths of the core body and the resin material to the molding device do not overlap each other, the resin material and the core body in the molding device can be set before and after without a time interval, and after supplying the resin material to the heating unit of the molding device, for example, the space portion of the core body can be filled with the resin before the molten resin heated by the heating unit is solidified, and the quality of the resin that has filled the space portion can be ensured.

According to another aspect of the present disclosure, the core unit may be the rotor of the rotating electric machine, being formed to fix a permanent magnet to a magnet insertion hole provided in the core body. The space portion may be at least one part of the magnet insertion hole. The molding device may be configured to: melt the resin material to form the resin; and fill the space portion with the molten resin. The molding device may feed the supplied resin material into the magnet insertion hole of the core body, and then melts the fed resin material to fill the space portion with the molten resin. And, the core unit manufacturing apparatus may be configured such that the permanent magnet is inserted into the magnet insertion hole after feeding the resin material into the magnet insertion hole, and before or while melting the resin material.

According to the present disclosure, when the permanent magnet is fixed to the magnet insertion hole of the core body to manufacture the core unit which is a rotor, by using the molding device in which the core body is carried in and out by the core transfer unit and the resin material is transferred and supplied by the resin transfer unit respectively from different directions, after the resin material is fed into the magnet insertion hole of the core body, the permanent magnet is fed into the magnet insertion hole, and the resin material is further melted to fill the space portion with the resin. Accordingly, the movement paths of the core body and the resin material to the molding device do not overlap each other, the resin material and the core body in the molding device can be set before and after without a time interval, a step of feeding the resin material into the magnet insertion hole in the molding device, feeding the permanent magnet, and filling the magnet insertion hole can be executed continuously and quickly, and the resin filling step by the molding device can be efficiently advanced.

According to another aspect of the present disclosure, the molding device may be configured from a plurality of molding devices. The plurality of molding devices may be disposed to be aligned. The resin transfer unit may include a carrying mechanism that is capable of moving the resin material at least along a direction in which the molding devices are aligned, the resin transfer unit being configured to supply the resin material moved to one side position of side surfaces for each of the molding devices. And, the core transfer unit may be arranged at the other side position opposed to one side position for each of the molding devices, the core transfer unit being configured to carry the core body in and out of each molding device.

According to the present disclosure, the plurality of molding devices are disposed to be aligned, and according to this disposition, the resin material is moved along the alignment direction of the molding devices by the resin transfer unit, the resin material can also be supplied to any of the molding devices, and further, the core transfer unit is positioned on the side of the molding device that is opposite to the side where the resin transfer unit is present. Accordingly, the resin material can be appropriately supplied by moving the resin material to the plurality of molding devices by the resin transfer unit, and the efficiency of resin injection into the core body can be improved. In addition, the core transfer unit that makes the core body go in and out of the molding device is positioned on the opposite side of the molding device from the resin transfer unit, each part does not interfere with the operation of transferring and supplying the resin material of the resin transfer unit, and each part of the resin transfer unit is also disposed so as not to interfere with the movement related to the handling of the core body of the core transfer unit. Accordingly, the movement of each mechanism can be simplified without any problem, cost reduction of each mechanism can be achieved, the operation of each mechanism related to the movement of the core body or the resin material is simplified, the carrying-in of the core body and the supply of resin material can be made reasonably stable, and it is possible to smoothly shift from the step of the carrying-in of the core body and the supply of the resin material to the step of resin injection by the molding device.

According to another aspect of the present disclosure, the molding device may be configured from a plurality of molding devices. The plurality of molding devices may be disposed to be aligned. The core transfer unit may include a sub-transfer mechanism that is capable of moving the core body before being carried into the molding device and after being carried out of each molding device along a direction in which the molding devices are aligned, the core transfer unit being configured to carry the core body in and out of each of the molding devices at the other side position of the side surfaces for each of the molding devices in the sub-transfer mechanism. The resin transfer unit may be arranged at one side position opposed to the other side position for each of the molding devices, the resin transfer unit being configured to supply the resin material to each molding device.

According to the present disclosure, the plurality of molding devices are disposed to be aligned, and according to this disposition, the core body is moved along the alignment direction of the molding devices by the main transfer mechanism of the core transfer unit, the core body can be carried in and out of any of the molding devices by the core transfer unit. Further, by positioning the resin transfer unit on the side of the molding device opposite to the side where the core transfer unit is present, the core body is moved to the plurality of molding devices by the main transfer mechanism, the core body can be appropriately carried in, the efficiency of resin injection into the core body can be improved, and the shift to the step of carrying the core body out of the molding device and the following step is also quickly performed. The resin transfer unit that supplies the resin to the molding device is positioned on the opposite side of the core transfer unit with respect to the molding device, each part does not interfere with the operation of the core transfer unit that carries in and out the core body, and each part of the core transfer unit is also disposed so as not to interfere with the movement related to the transfer and supply of the resin of the resin transfer unit. Accordingly, the movement of each mechanism can be simplified without any problem, cost reduction of each mechanism can be achieved, the operation of each mechanism related to the movement of the core body or the resin material is simplified, the carrying-in of the core body and the supply of resin material can be made reasonably stable, and it is possible to smoothly shift from the step of the carrying-in of the core body and the supply of the resin material to the step of resin injection by the molding device.

According to another aspect of the present disclosure, the core unit manufacturing apparatus may further include a preheating device that preheats the core body. The core transfer unit may be configured to carry the preheated core body out of the preheating device, to move the core body to the other side position of the molding device, and to carry the core body into the molding device. The sub-transfer mechanism of the core transfer unit may include a path for moving the core body before being carried into the molding device, a part of the path being positioned adjacently to the preheating device.

According to the present disclosure, the path for moving the core body by the sub-transfer mechanism of the core transfer unit also exists in the vicinity of the preheating device, and the core body preheated by the preheating device is carried out by the core transfer unit and then moved by the sub-transfer mechanism to the molding device. Accordingly, the preheated core body can be quickly carried into the molding device to inject the resin, the resin can be introduced into the molding device without significantly changing the temperature of the preheated core body, and when the molten resin is injected into the space portion of the core body, it is less likely to receive an effect from the temperature difference, it is possible to appropriately inject the resin, fill the space portion of the core body, and solidify the resin, and the quality of the resin after solidification can be improved.

According to another aspect of the present disclosure, the resin transfer unit and the core transfer unit may be arranged such that one side position and the other side position are at a right angle with respect to the molding device.

According to another aspect of the present disclosure, a path through which the resin material is supplied from the resin transfer unit to the molding device and another path through which the core body is carried in and out of the molding device from the core transfer unit may be designed without overlapping with each other.

According to another aspect of the present disclosure, a core unit manufacturing method for manufacturing a core unit of a stator or a rotor in a rotating electric machine, the core unit being formed by filling a resin into a space portion provided as a target for filling the resin in a core body formed by laminating a plurality of thin plates made of a magnetic metal material, includes: transferring, as a resin transfer step, a resin material to a molding device to supply the resin material thereto by a resin transfer unit; carrying, as a core carrying-in step, the core body into a part between a pair of dies of the molding device by a core transfer unit; filling, as a molding step, the space portion in the core body with resin by the molding device; and carrying, as a core carrying-out step, the core body out of the part between the pair of dies of the molding device by the core transfer unit. The supplying of the resin material to the molding device by the resin transfer unit and the carrying of the core body in and out of the molding device by the core transfer unit are respectively performed from two side positions having different directions to the molding device.

DESCRIPTION OF EMBODIMENTS

First Embodiment of Present Disclosure

Figure 1:
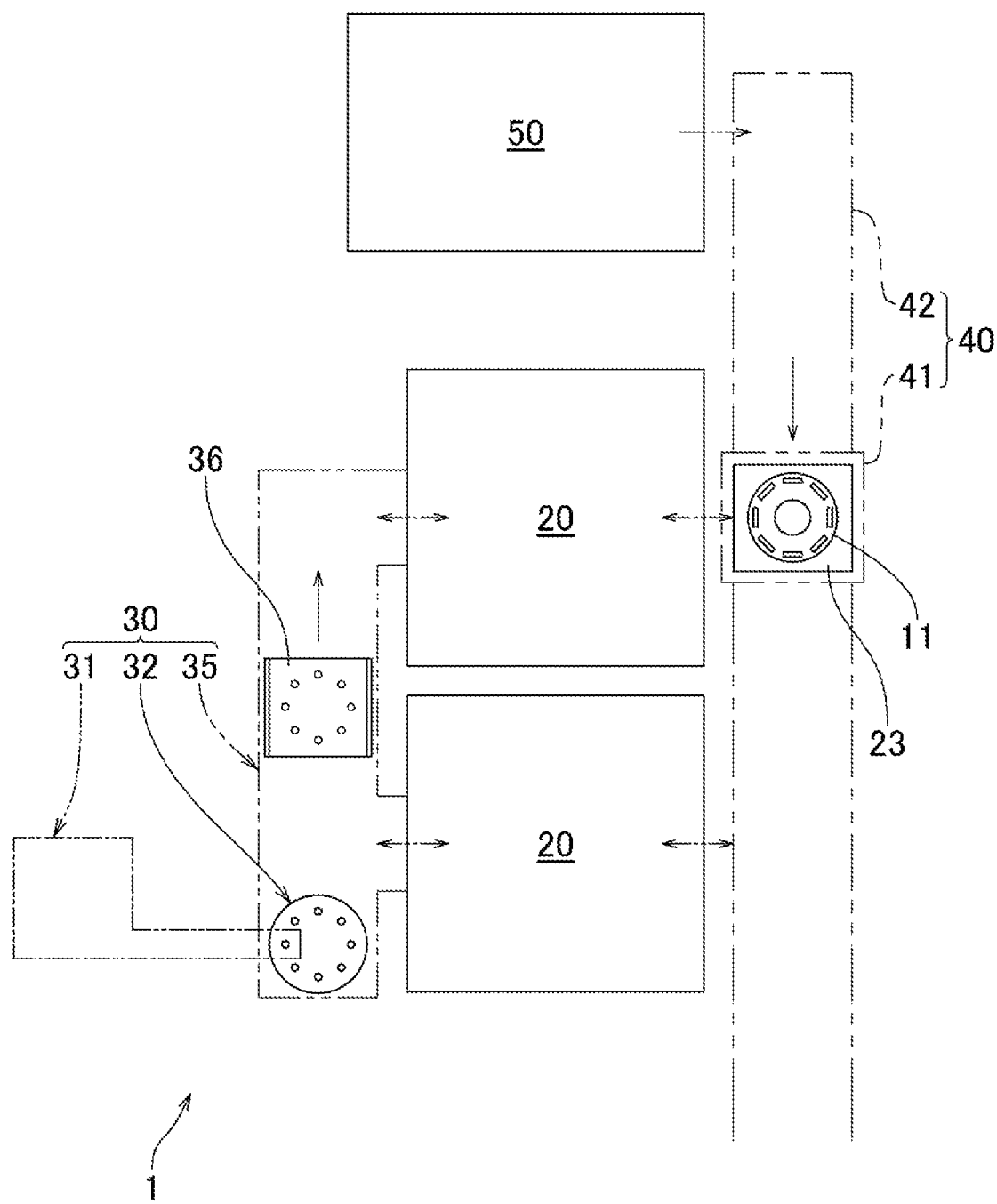
FIG. 1 is a schematic plan view of a core unit manufacturing apparatus according to a first embodiment of the present disclosure.

Hereinafter, a core unit manufacturing apparatus according to a first embodiment of the present disclosure will be described based on FIGS. 1 to 19.

In each of the above-described drawings, a core unit manufacturing apparatus 1 according to the embodiment fills a plurality of space portions in a core body 11 having a laminated structure with molten resin and solidifies the molten resin to manufacture a core unit 10 that configures a rotor of a rotating electric machine. Specifically, the core unit manufacturing apparatus 1 includes a molding device 20 that fills the core body 11 with molten resin, a resin transfer unit 30 that supplies the resin material which is a melting target to the molding device 20, and a core transfer unit 40 that carries the core body 11 in and out from between upper and lower dies of the molding device 20.

Figure 18:
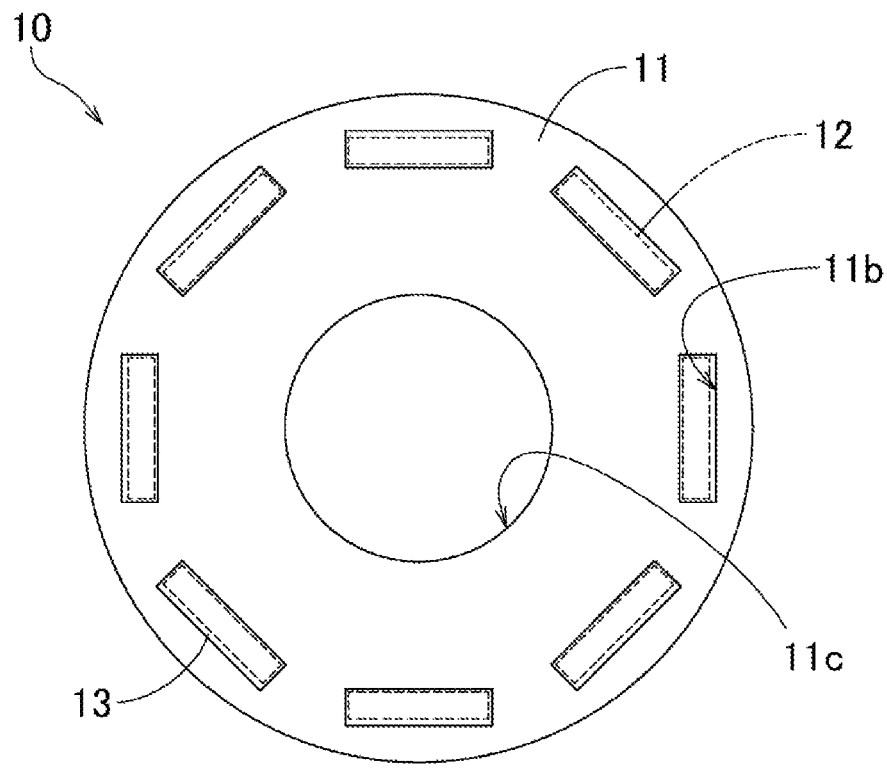
FIG. 18 is a plan view of the core body after the resin filling by the core unit manufacturing apparatus according to the first embodiment of the present disclosure.
Figure 19:
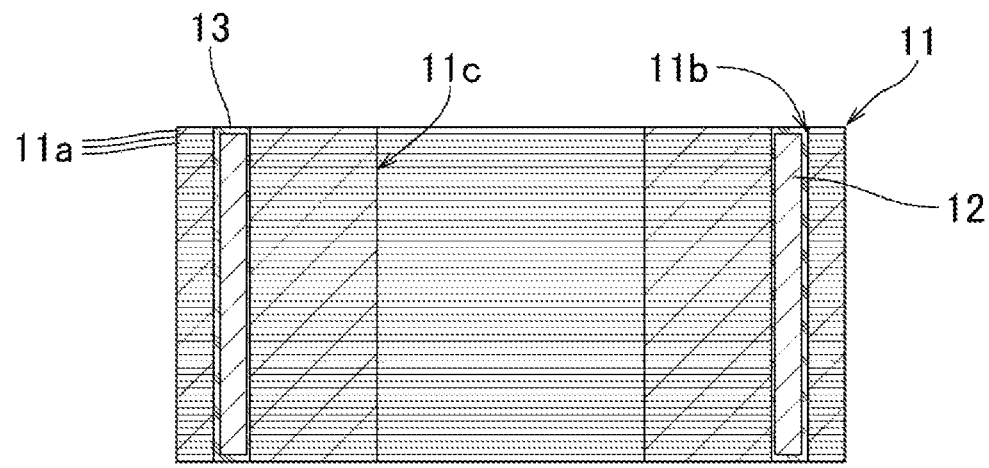
FIG. 19 is a longitudinal sectional view of the core body after the resin filling by the core unit manufacturing apparatus according to the first embodiment of the present disclosure.
Figure 20:
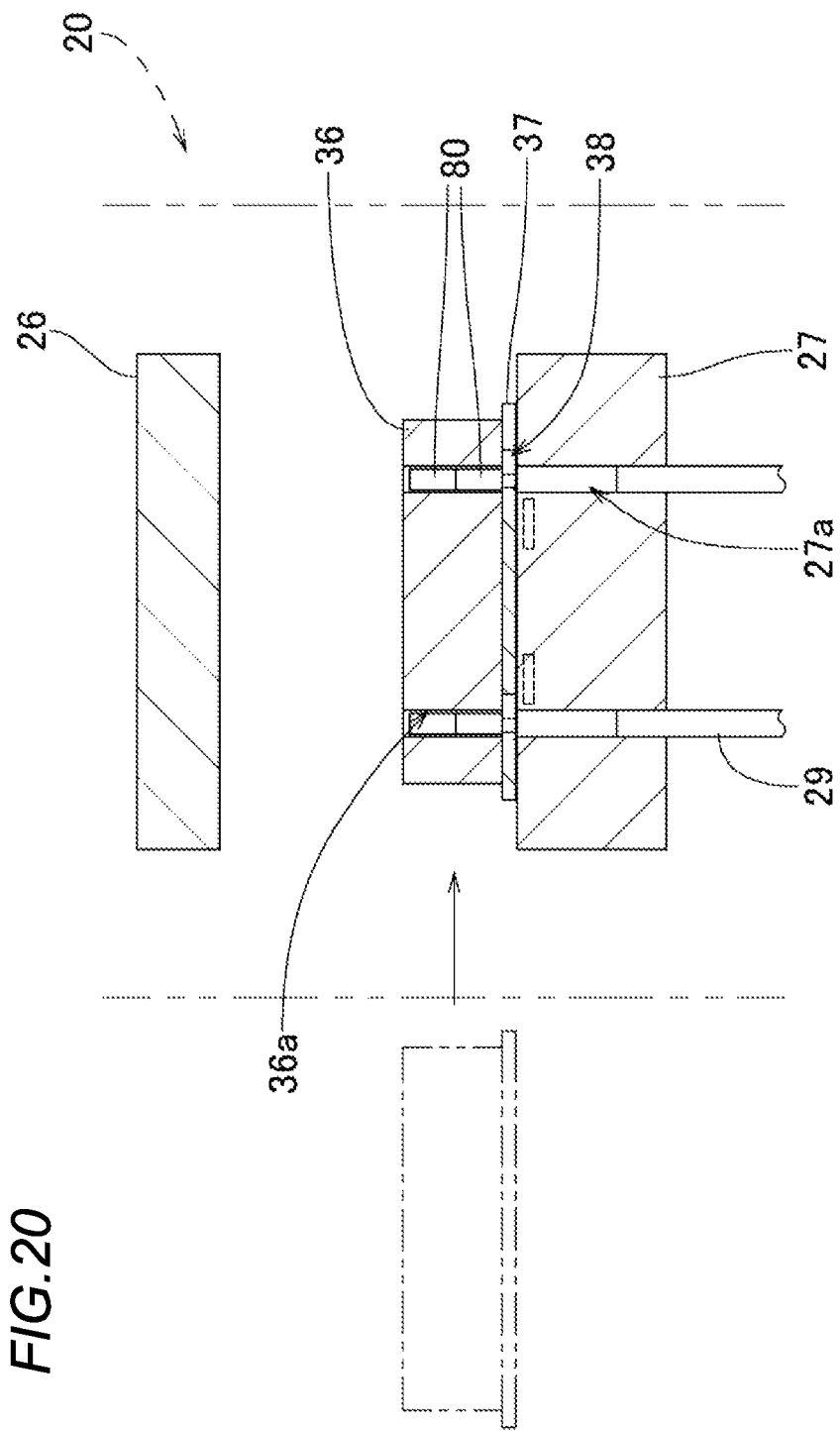
FIG. 20 is a view of illustrating a state where a resin tablet is carried into a molding device in a core unit manufacturing apparatus according to a second embodiment of the present disclosure.
Figure 21:
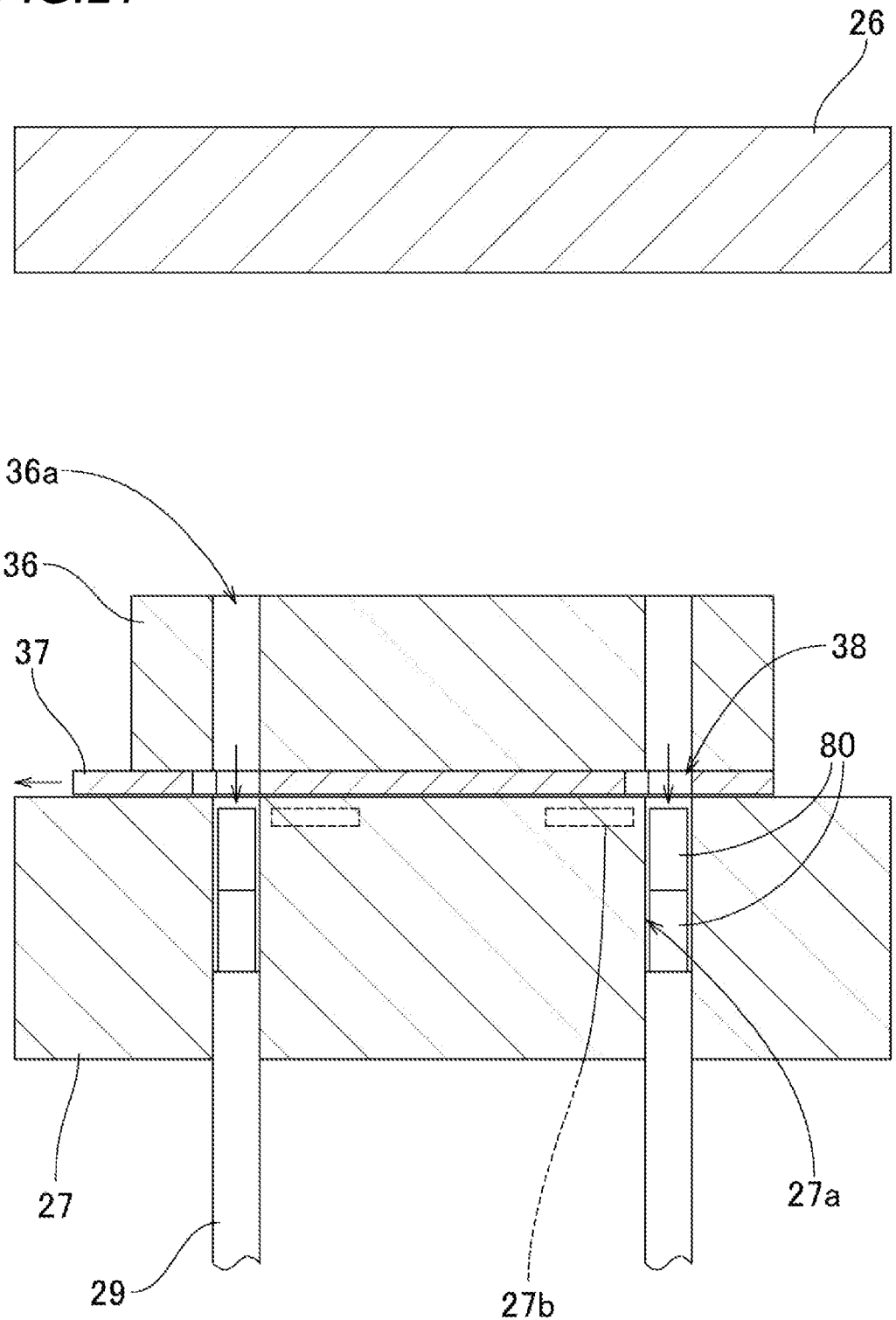
FIG. 21 is a view of illustrating a state where the resin tablet moves to a lower die accommodation hole of the molding device in the core unit manufacturing apparatus according to the second embodiment of the present disclosure.
Figure 22:
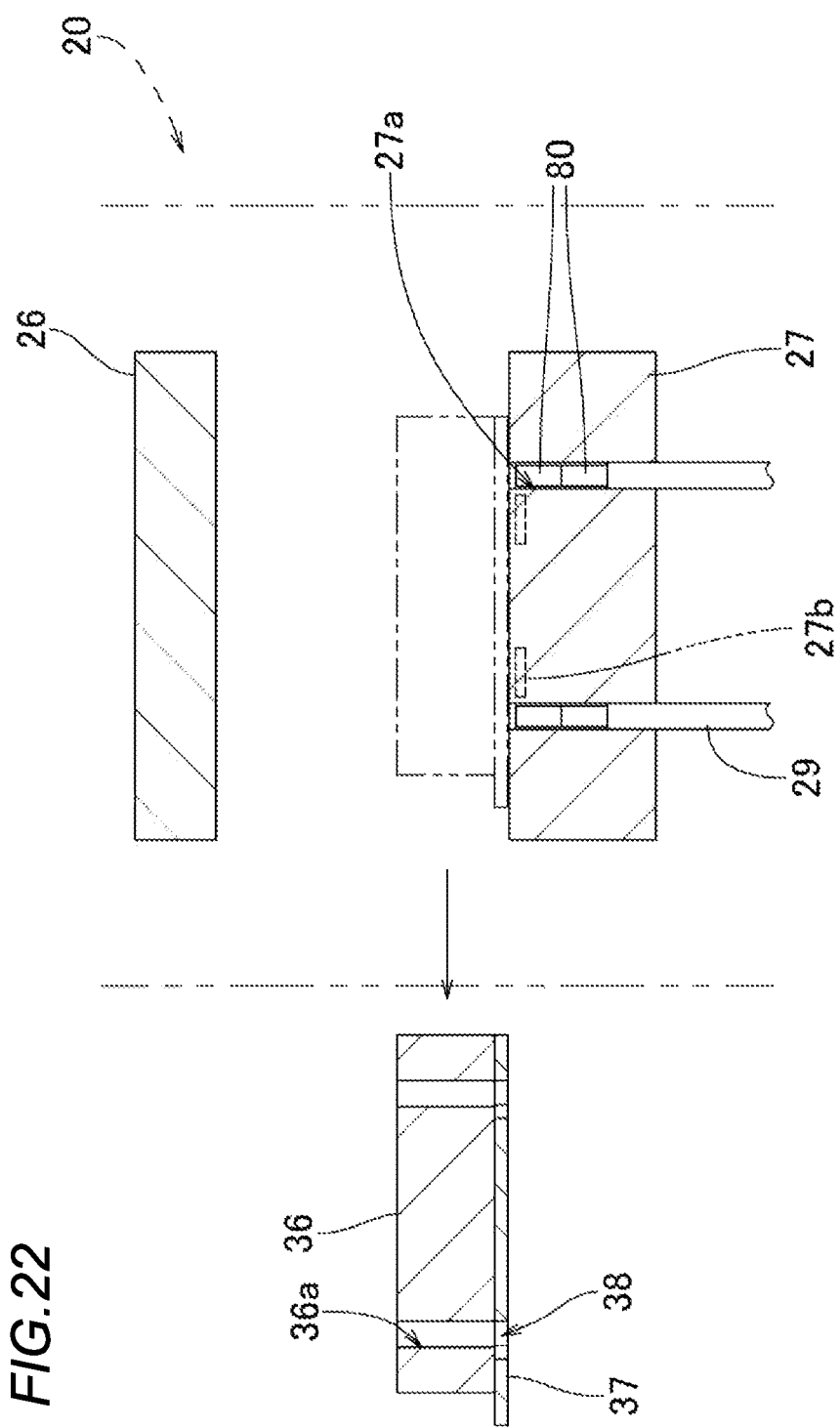
FIG. 22 is a view of illustrating a state where a carrying unit and an opening and closing member of a resin transfer unit retract to the outside of the molding device in the core unit manufacturing apparatus according to the second embodiment of the present disclosure.

The core unit 10 manufactured by the core unit manufacturing apparatus 1 according to the embodiment includes: the core body 11 formed by laminating a plurality of thin plates 11a made of a magnetic metal material; a plurality of permanent magnets 12 provided in the core body 11 and disposed to be inserted into each of the magnet insertion holes 11b; and a resin filler 13 disposed to fill a part other than the permanent magnet in each of the magnet insertion holes 11b (refer to FIGS. 18 and 19). The core unit 10 has a known structure as a rotor of a rotating electric machine (electric motor or generator), and the detailed description thereof will be omitted.

The core body 11 is a laminated core formed by laminating a plurality of thin plates 11a made of magnetic metal material. The thin plate 11a that forms the core body 11 is punched out of a thin plate material made of electromagnetic steel or amorphous alloy.

The core body 11 is provided with the plurality of magnet insertion holes 11b for providing the permanent magnets 12. The magnet insertion holes 11b are holes that penetrate the core body 11 in the laminating direction of the thin plates 11a, and are disposed at predetermined intervals along the circular periphery of the core body 11. The position, shape, and number of the magnet insertion holes 11b can be appropriately set according to the application of the rotating electric machine and the required performance.

In addition to this, a shaft hole 11c, which penetrates the core body 11 in the laminating direction of the thin plates 11a, is provided at the center of the core body 11 and the rotation shaft (shaft) of the rotor can be inserted and fixed into the shaft hole 11c.

The permanent magnet 12 is disposed to be inserted into each magnet insertion hole 11b of the core body 11 for the field magnet of the rotor. Since the permanent magnet 12 is formed slightly smaller than the magnet insertion hole 11b of the core body 11, when the permanent magnet 12 is inserted into each magnet insertion hole 11b, a gap is generated between the permanent magnet 12 and the core body 11. In other words, each of the magnet insertion holes 11b into which the permanent magnet 12 is inserted is in a state where a part thereof remains as a space. The remaining part other than the permanent magnet 12 in the magnet insertion hole 11b is the space portion which is a resin filling target in the core body 11.

The filler 13 is a resin that is injected, fills the remaining part of the magnet insertion hole 11b after the permanent magnet 12 is inserted in a molten state, and is solidified after filling. The resin that makes the filler 13 is, for example, a thermosetting resin such as epoxy resin or a thermoplastic resin, and is obtained by melting and then solidifying the resin material supplied as a resin tablet or the like.

The filler 13 fixes the permanent magnet 12 in the magnet insertion hole 11b and also contributes to strengthening the connection between the laminated thin plates 11a adjacent to each other.

The molding device 20 injects and fills the space portion, which is a resin filling target in the core body 11, with the molten resin.

The molding device 20 includes: an upper die 21 and a lower die 22 that sandwich the core body 11 from both sides in the axial direction; a jig 23 that supports the core body 11; a heating unit 24 that heats the resin material; and an extrusion unit 25 that extrudes the heated and melted resin toward the magnet insertion hole 11b of the core body 11.

In the molding device 20, the core body 11 placed on the jig 23 is sandwiched and pressed by the upper die 21 and the lower die 22 from both sides in the axial direction. Accordingly, a predetermined load is applied to the core body 11 from the height direction, and the end portion of the core body 11 in the axial direction can be closed except for each of the magnet insertion holes 11b.

The upper die 21 is positioned above the core body 11 placed on the lower die 22, and sandwiches the core body 11 and the jig 23 together with the lower die 22. The upper die 21 is a mold that is formed in the shape of a rectangular plate, for example, and is configured to have a plurality of through holes 21a. The plurality of through holes 21a are provided at predetermined intervals so as to be positioned at locations corresponding to each of the magnet insertion holes 11b of the core body 11 in a state where the core body 11 is sandwiched between the upper die 21 and the lower die 22.

The lower die 22 is used to sandwich the core body 11 and the jig 23 together with the upper die 21 while placing and supporting the core body 11 and the jig 23. The lower die 22 is a mold formed in a rectangular plate shape, for example, and is provided with a recess portion or a projection portion that is fitted to the projection portion or the recess portion provided on the lower surface of the jig 23 as necessary to prevent unnecessary movement of the jig.

Figure 2:
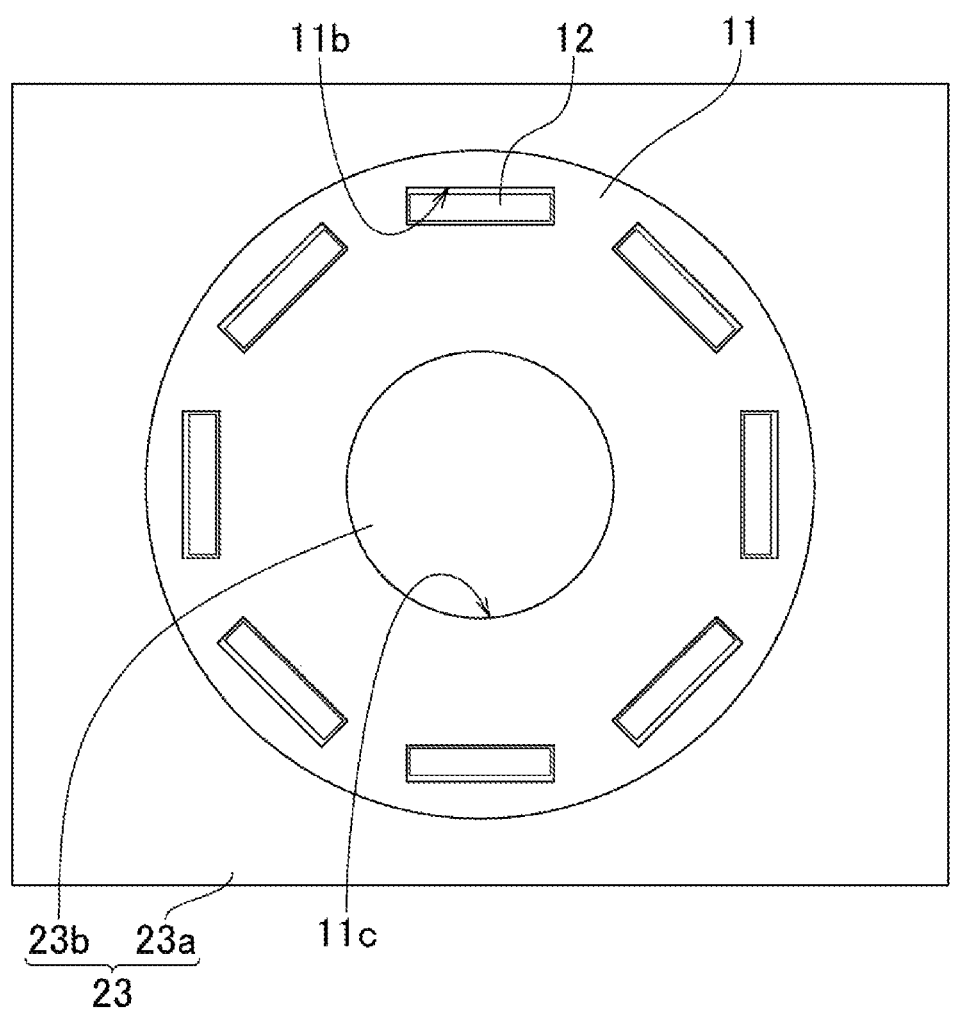
FIG. 2 is a plan view of a core body placed on a jig before resin filling by the core unit manufacturing apparatus according to the first embodiment of the present disclosure.
Figure 3:
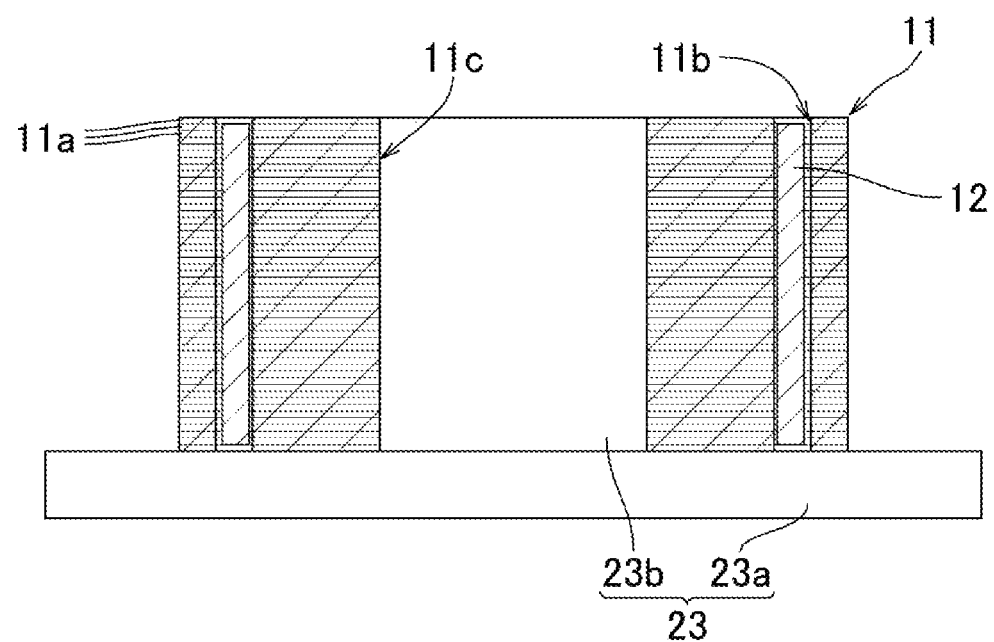
FIG. 3 is a longitudinal sectional view of the core body placed on the jig before the resin filling by the core unit manufacturing apparatus according to the first embodiment of the present disclosure.

The jig 23 includes a base member 23a on which the core body 11 can be placed, and an insertion post 23b that protrudes upward substantially from the center portion of the base member 23a (refer to FIGS. 2 and 3).

The base member 23a, for example, is a rectangular plate-shaped platform member, and supports the core body 11 by placing the core body 11. The insertion post 23b is formed in a cylindrical shape and is disposed to protrude upward substantially at the center portion of the upper surface of the base member 23a. The insertion post 23b has a cylindrical shape with a size corresponding to the shaft hole 11c of the core body 11, and can be inserted into the shaft hole 11c of the core body 11.

The heating unit 24 heats and melts a resin tablet 80 as the resin material supplied from the resin transfer unit 30 to obtain a molten resin 81.

The heating unit 24 is disposed to face the lower die 22 and to be capable of coming into contact with the core body 11 and the jig 23, which are placed on the lower die 22, from above. The heating unit 24 can be pressed from above by the upper die 21, and when the upper die 21 and the lower die 22 sandwich the core body 11 and the jig 23, a predetermined load is applied to the upper part of the core body 11 from above through the heating unit 24.

The heating unit 24 is provided with a plurality of accommodation holes 24a disposed corresponding to the plurality of magnet insertion holes 11b of the core body 11, and is configured to be capable of accommodating a predetermined number of resin tablets 80.

Each of the accommodation holes 24a is a continuous hole in the height direction of the heating unit 24, and each can accommodate at least one resin tablet. When the plurality of resin tablets 80 are accommodated in the accommodation hole 24a, the resin tablets 80 are accommodated in the hole in the state of being aligned in a row in the continuous hole direction.

The heating unit 24 is provided with a heater 24b that heats the heating unit 24. The heater 24b heats the heating unit 24 and is capable of heating the resin tablet 80 accommodated in each of the accommodation holes 24a. When the resin tablet 80 is heated by the heater 24b, the resin tablet 80 melts and becomes the molten resin 81. The heater 24b is not limited to the configuration of being disposed inside the heating unit 24, but may also be disposed outside the heating unit 24.

The extrusion unit 25 can extrude the molten resin 81 to the magnet insertion hole 11b of the core body 11, and for example, is configured as a plurality of plungers that can be moved up and down by the driving by a predetermined driving source.

Figure 16:
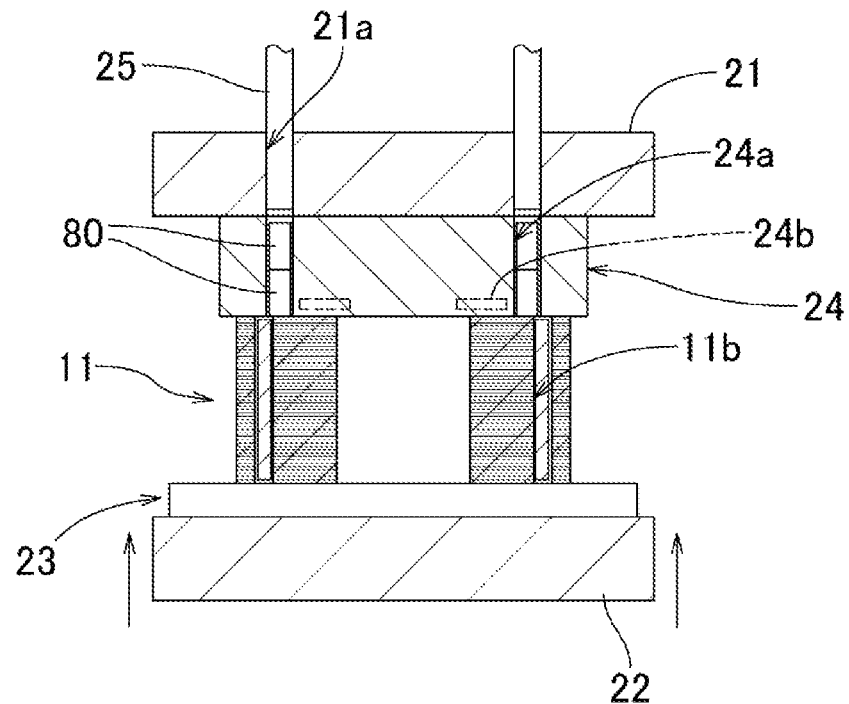
FIG. 16 is a view of illustrating a state where a core body is pressed by an upper die and a lower die of the molding device in the core unit manufacturing apparatus according to the first embodiment of the present disclosure.
Figure 17:
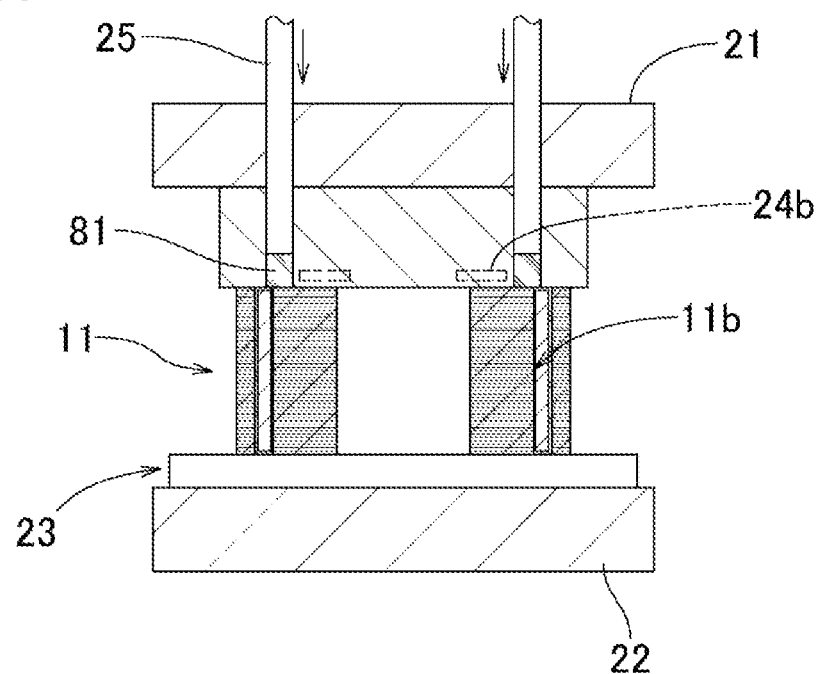
FIG. 17 is a view of illustrating a state where a molten resin is injected by the molding device in the core unit manufacturing apparatus according to the first embodiment of the present disclosure.

Each of the extrusion units 25 is disposed to be insertable from above into the accommodation hole 24a of the heating unit 24 through the through hole 21a of the upper die 21, respectively (refer to FIGS. 16 and 17). Each of the extrusion units 25 can be driven by a corresponding driving source for each extrusion unit to be movable up and down, or a plurality of extrusion units can be driven together by a single driving source to be integrally movable up and down.

As shown in FIG. 1, the resin transfer unit 30 transfers and supplies the resin tablets 80 as a resin material to the heating unit 24 between the upper and lower dies of the molding device 20. The resin transfer unit 30 includes: a material supply unit 31 that feeds the resin tablet 80 for supply; a disposition mechanism 32 that holds the resin tablet 80 in the disposition for transfer; and a carrying mechanism 35 that holds and moves the resin tablet 80.

Figure 4:
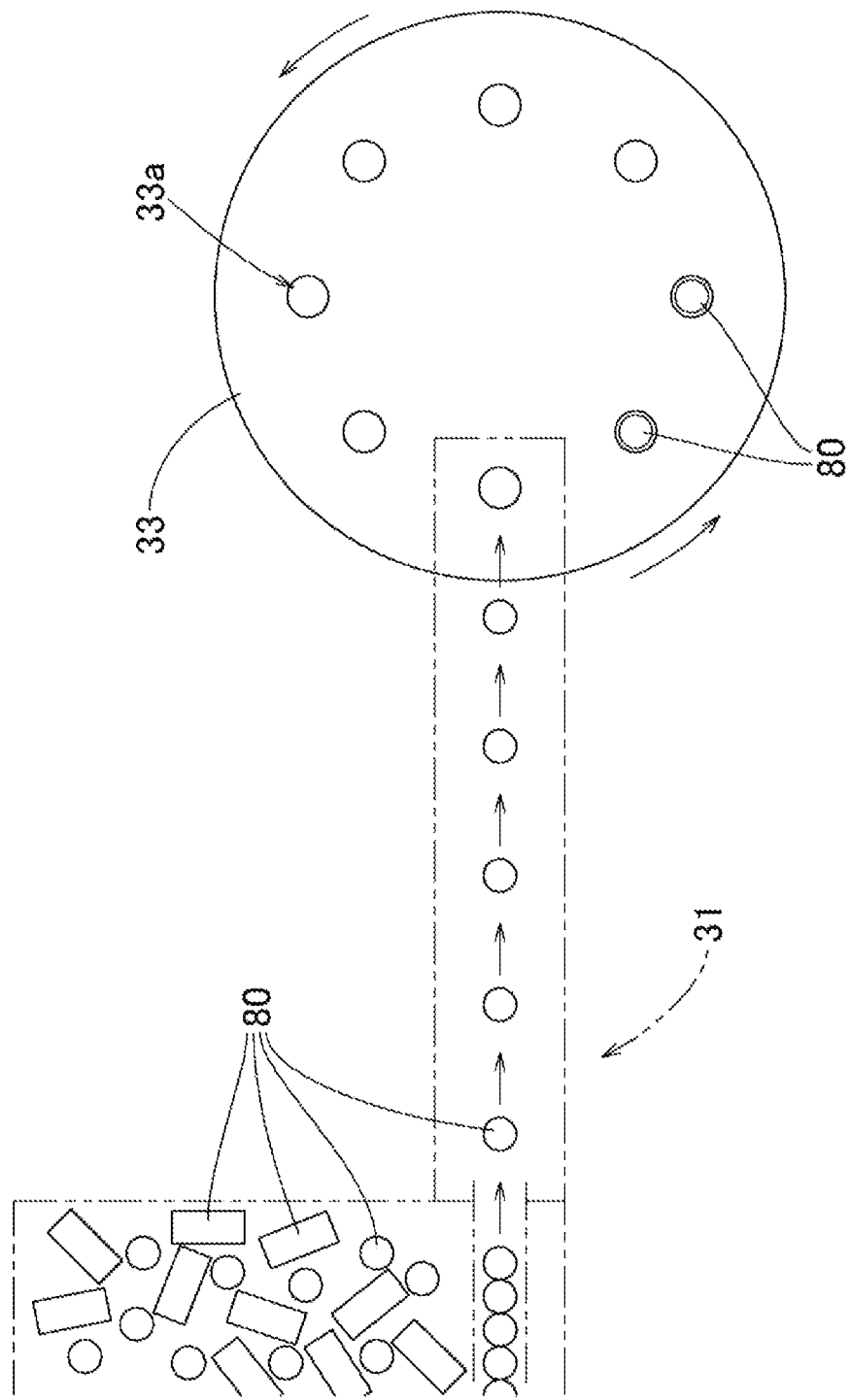
FIG. 4 is a view of illustrating a state where a resin tablet is supplied to a disposition unit by a material supply unit in a resin transfer unit of the core unit manufacturing apparatus according to the first embodiment of the present disclosure.

As shown in FIG. 4, the material supply unit 31 sequentially feeds one or more resin tablets 80 from a large number of resin tablets 80 in a stored state, while aligning the resin tablets 80 in a predetermined direction, and directs the resin tablets 80 to the disposition mechanism 32.

Figure 5:
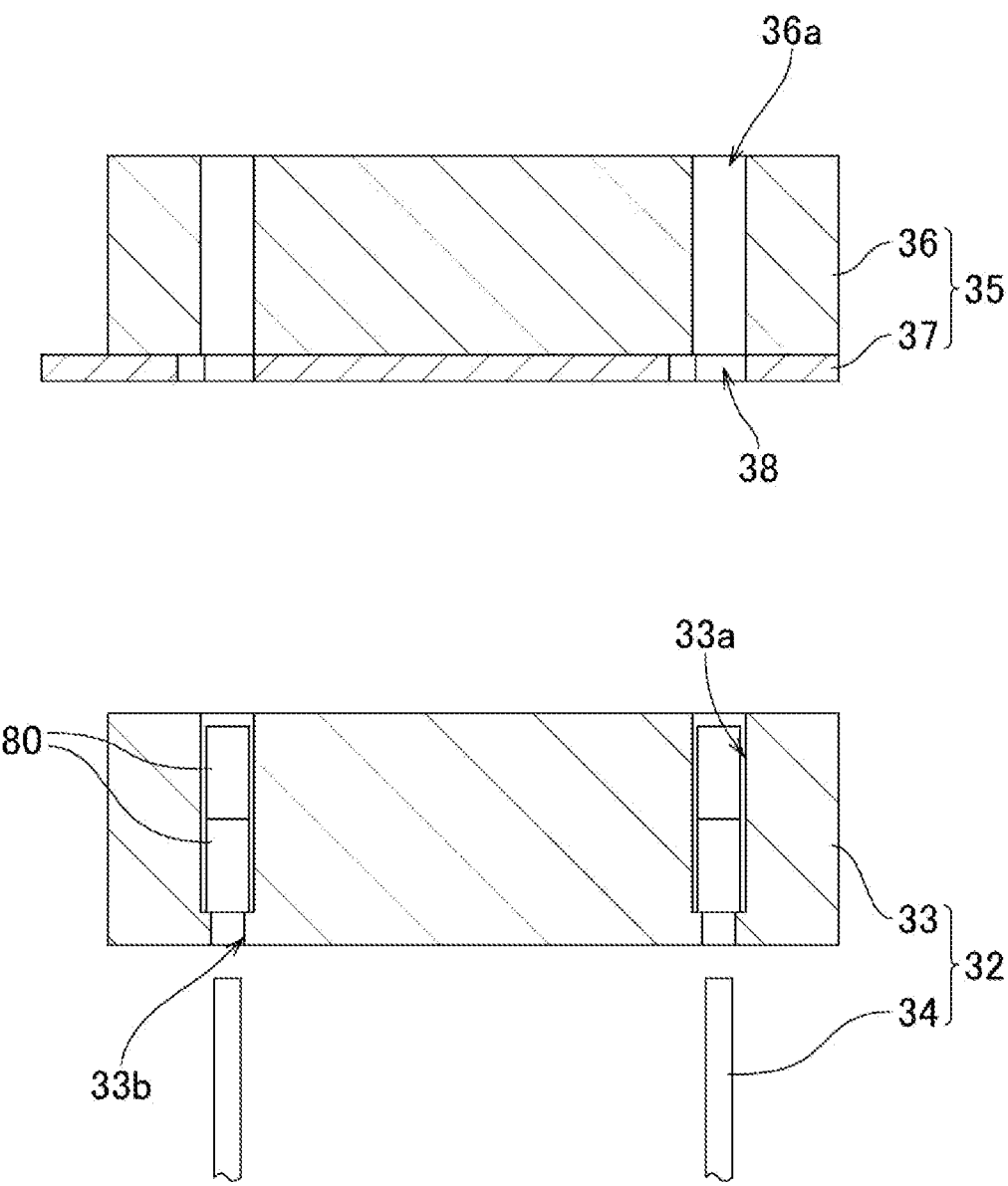
FIG. 5 is a view of illustrating a state where a carrying unit and an opening and closing member arrive above a disposition mechanism in the resin transfer unit of the core unit manufacturing apparatus according to the first embodiment of the present disclosure.
Figure 6:
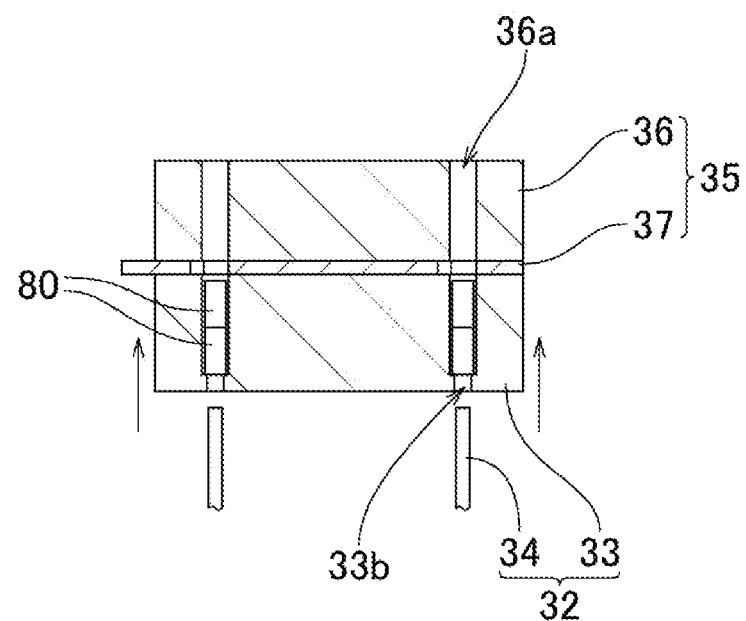
FIG. 6 is a view of illustrating a moving state above the disposition mechanism in the resin transfer unit of the core unit manufacturing apparatus according to the first embodiment of the present disclosure.
Figure 7:
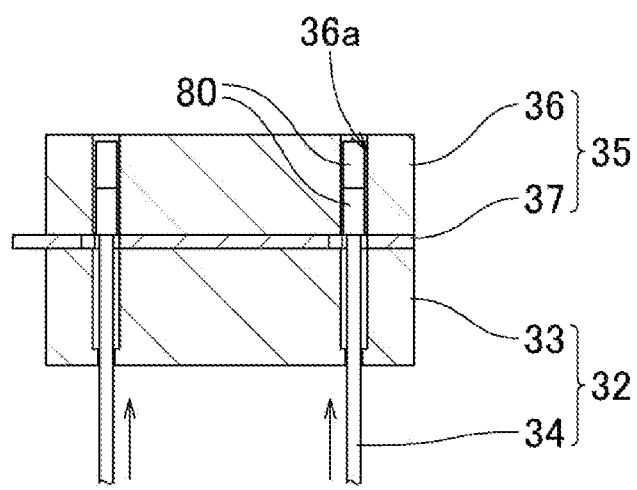
FIG. 7 is a view of illustrating a state where the resin tablet moves from the disposition mechanism to the carrying unit in the resin transfer unit of the core unit manufacturing apparatus according to the first embodiment of the present disclosure.

As shown in FIG. 5, the disposition mechanism 32 includes: a disposition unit 33 that holds a plurality of resin tablets 80; and a raising and lowering unit 34 that moves the resin tablets 80 in the disposition unit 33.

As shown in FIGS. 4 and 5, the disposition unit 33 is provided with a plurality of accommodation holes 33a and a plurality of insertion holes 33b, and is capable of holding a predetermined number of resin tablets 80. The disposition unit 33 can move up and down and rotate around the center axis, which is vertical, by the driving by a driving source such as a motor.

Each of the accommodation holes 33a is disposed to correspond to each of the magnet insertion holes 11b of the core body 11, and is a continuous hole in the height direction of the disposition unit 33, and each can accommodate at least one resin tablet 80. When the plurality of resin tablets 80 are accommodated, the resin tablets 80 are accommodated in the hole in a state of being aligned in a row in the continuous hole direction.

Each of the insertion holes 33b is provided below each of the accommodation holes 33a so as to communicate with each of the accommodation holes 33a, and similar to the accommodation holes 33a, the insertion holes 33b are continuous in the height direction of the disposition unit 33. Each of the insertion holes 33b is designed to have a smaller opening area than that of the accommodation hole 33a, and the resin tablet 80 accommodated in the accommodation hole 33a is prevented from entering the insertion hole 33b and dropping.

The raising and lowering unit 34 is a mechanism that can expand and contract in the up-down direction, such as a fluid pressure cylinder. Each tip part of the plurality of raising and lowering units 34 can be inserted into the insertion hole 33b and the accommodation hole 33a from below the disposition unit 33 and can move up and down in each hole. When the tip part of the raising and lowering unit 34 is raised in a state where the resin tablet 80 is accommodated in the accommodation hole 33a, the resin tablet 80 will be pushed up out of the accommodation hole 33a by the tip part.

The carrying mechanism 35 includes: a carrying unit 36 that holds the plurality of resin tablets 80; and an opening and closing member 37 that controls the entry and exit of the resin tablets 80 into the carrying unit 36.

The carrying unit 36 is provided with a plurality of accommodation holes 36a disposed to correspond to each of the magnet insertion holes 11b of the core body 11, and is capable of holding a predetermined number of resin tablets 80.

Each of the accommodation holes 36a is continuous in the height direction of the carrying unit 36, and each can accommodate at least one resin tablet 80. When the plurality of resin tablets 80 are accommodated, the resin tablets 80 are accommodated in the hole in a state of being aligned in a row in the continuous hole direction.

Figure 10:
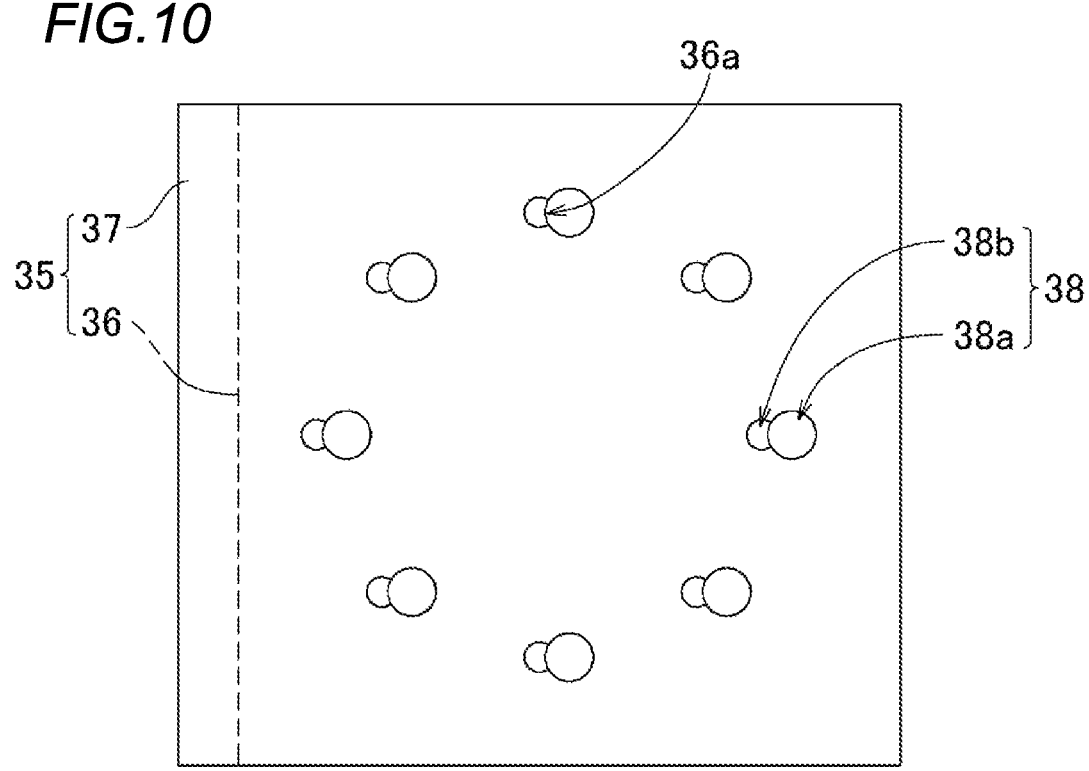
FIG. 10 is a bottom view of the opening and closing member in a state of being at a first position in the resin transfer unit of the core unit manufacturing apparatus according to the first embodiment of the present disclosure.
Figure 11:
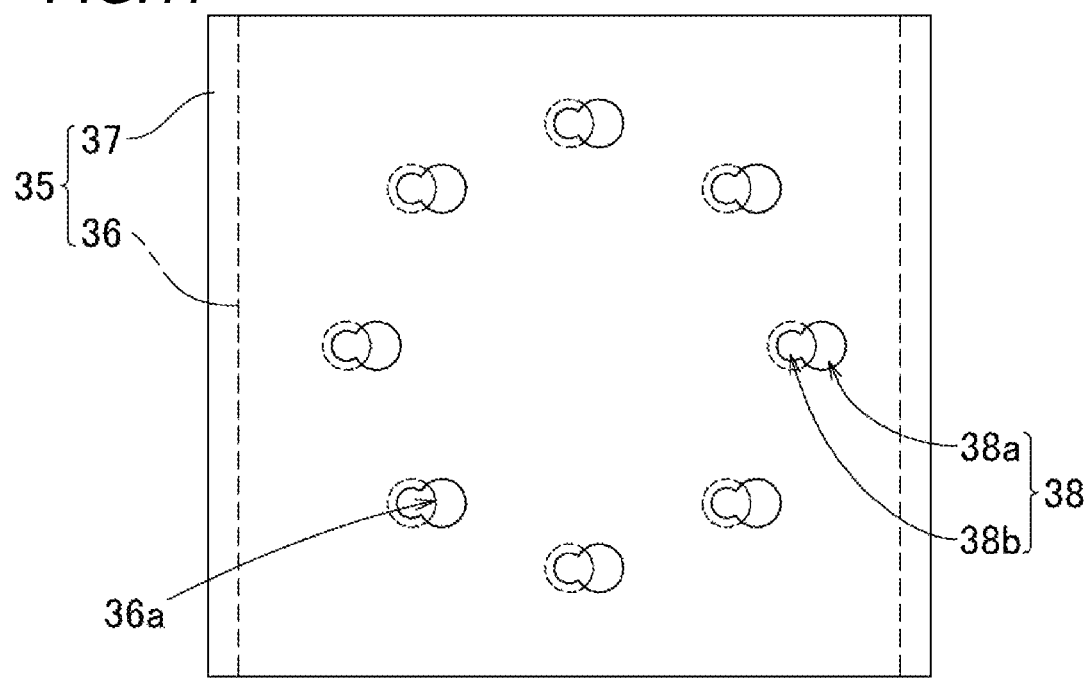
FIG. 11 is a bottom view of the opening and closing member in a state of being at a second position in the resin transfer unit of the core unit manufacturing apparatus according to the first embodiment of the present disclosure.

As shown in FIGS. 10 and 11, the opening and closing member 37 is disposed adjacent to the lower portion of the carrying unit 36. The opening and closing member 37 is provided with a plurality of through holes 38 that are continuous in the height direction.

Each of the through holes 38 includes: a first hole portion 38a which is disposed to correspond to the accommodation hole 36a of the carrying unit 36; and a second hole portion 38b which is communicated to the first hole portion 38a in a direction where the first hole portion 38a and the second hole portion 38b is arranged side by side. Of these, the first hole portion 38a is set to a size large enough to allow the resin tablet 80 to pass therethrough. Meanwhile, the second hole portion 38b can make the tip part of the raising and lowering unit 34 passing therethrough, and is set to a size smaller than that of a bottom surface of the resin tablet 80 and large enough to prevent the resin tablet 80 from passing therethrough.

The opening and closing member 37 is movable in the horizontal direction with respect to the lower surface of the carrying unit 36 by a predetermined driving source, and is configured to move between, for example, the first position where the first hole portion 38a is disposed to overlap the accommodation hole 36a of the carrying unit 36 and the second position where the second hole portion 38b is disposed to overlap the accommodation hole 36a.

In a state where the opening and closing member 37 is at the first position (refer to FIG. 10), the resin tablet 80 can enter and exit the accommodation hole 36a through the first hole portion 38a of the opening and closing member 37. In a state where the opening and closing member 37 is at the second position (refer to FIG. 11), while the resin tablet 80 accommodated in the accommodation hole 36a is prevented from being dropped through the through hole 38, the tip part of the raising and lowering unit 34 is allowed to pass through the second hole portion 38b.

The carrying unit 36 and the opening and closing member 37, which configure the carrying mechanism 35, can move in the front-rear direction (approaching and separating directions) of the molding device 20 by the driving by a predetermined driving source between a side position on the side surface which is an opening part for carrying the resin material in the molding device 20 and a predetermined position on the heating unit 24 between the upper and lower dies of the molding device 20 (refer to FIGS. 13 and 15), and can move laterally along the alignment direction of the molding devices 20 between the upper part of the disposition mechanism 32 and the side surface of each of the molding devices 20.

Accordingly, the resin tablet 80 as the resin material held by the carrying unit 36 and the opening and closing member 37 can move from the upper part of the disposition mechanism 32 to the side position of each of the molding devices 20 along the alignment direction of the molding devices 20, and further, can supply the resin tablet 80 from the side position of the molding device 20 between the upper and lower dies of the molding device 20.

As shown in FIG. 1, the core transfer unit 40 is positioned on the side of the molding device 20, which is opposite to the side where the resin transfer unit 30 supplies the resin material to the molding device 20, and carries in and out the core body 11 between the upper and lower dies of the molding device 20.

Figure 12:
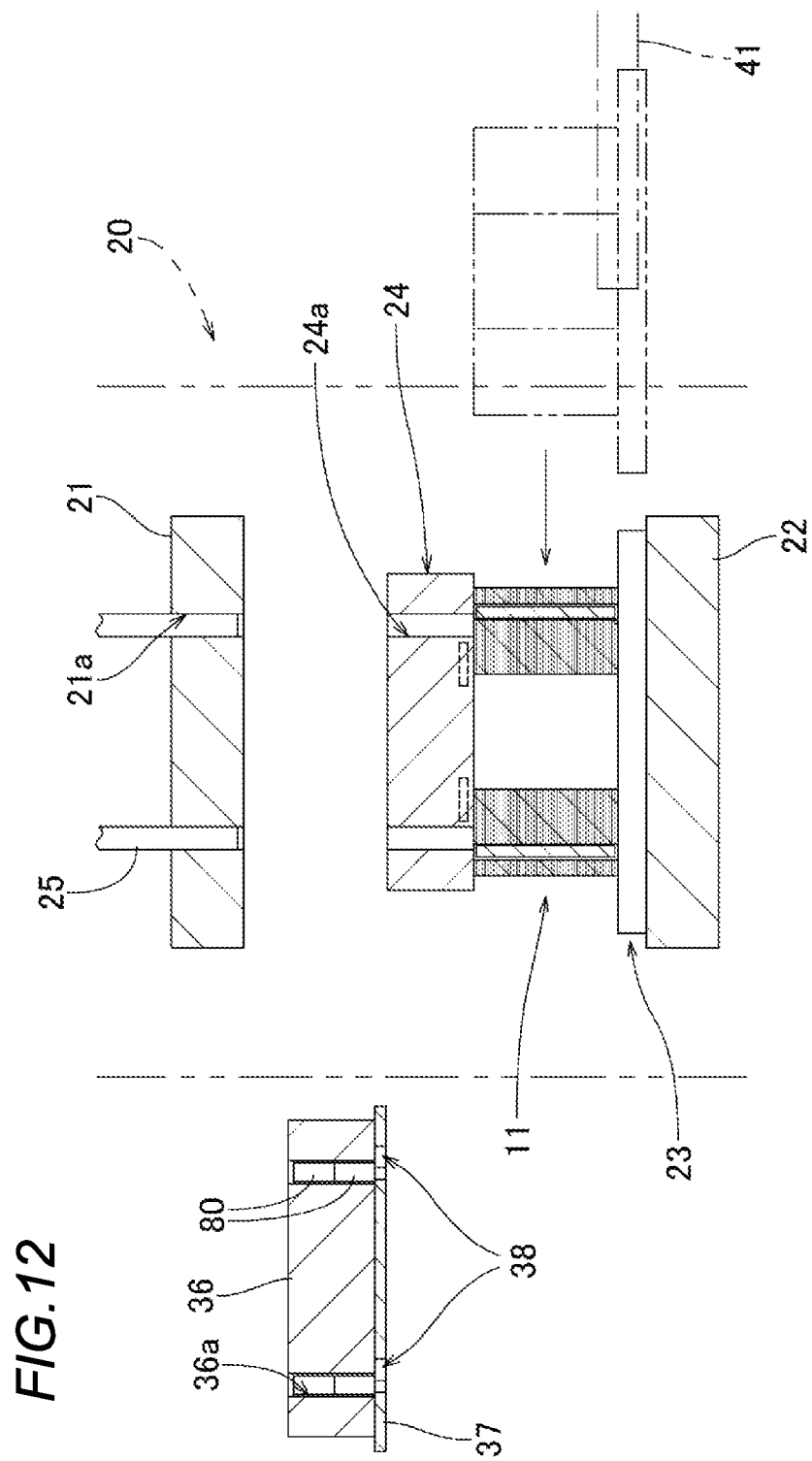
FIG. 12 is a view of illustrating a state where a core body is carried into the molding device in the core unit manufacturing apparatus according to the first embodiment of the present disclosure.
Figure 13:
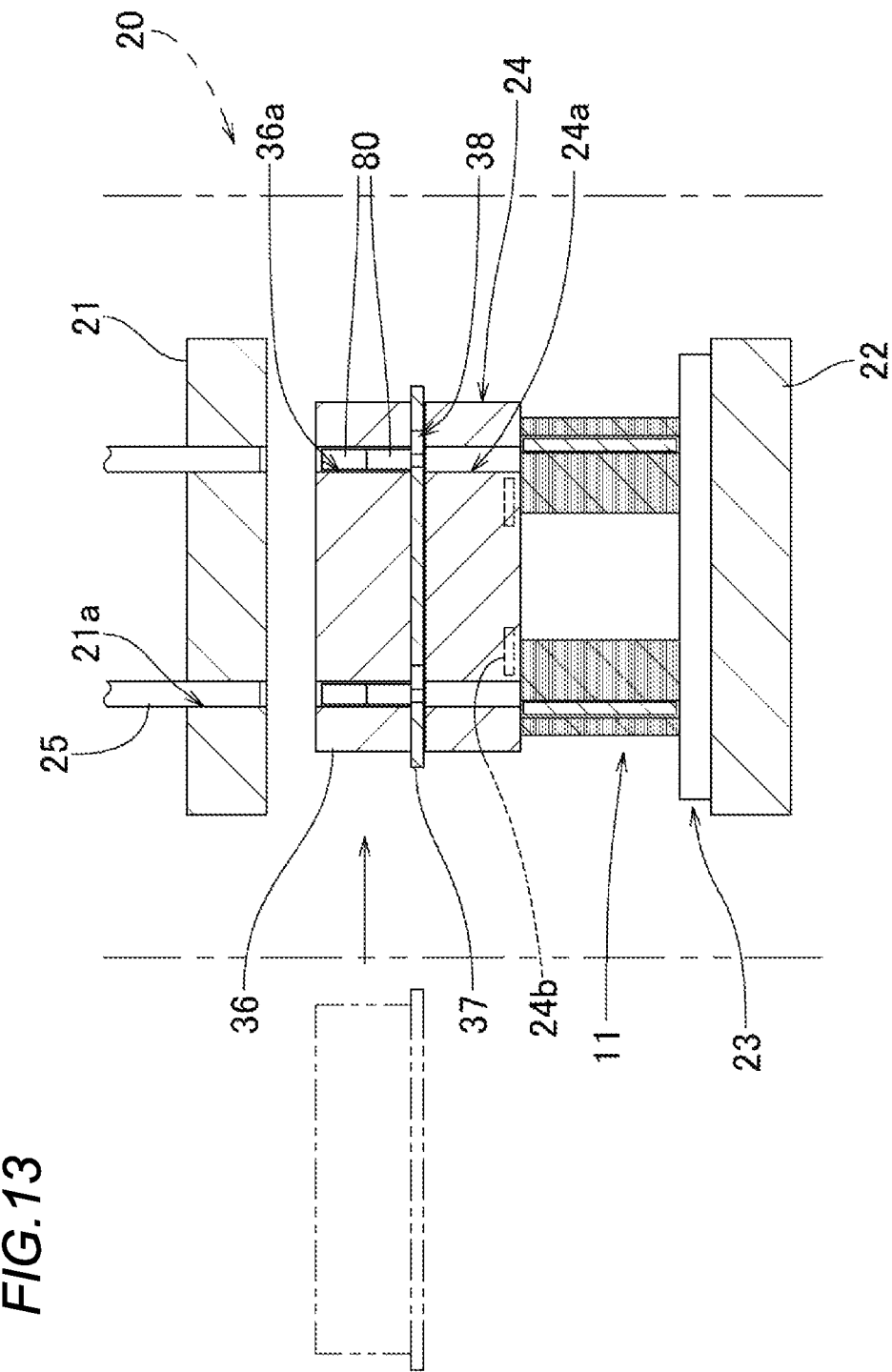
FIG. 13 is a view of illustrating a state where the resin tablet is carried into the molding device in the core unit manufacturing apparatus according to the first embodiment of the present disclosure.
Figure 14:
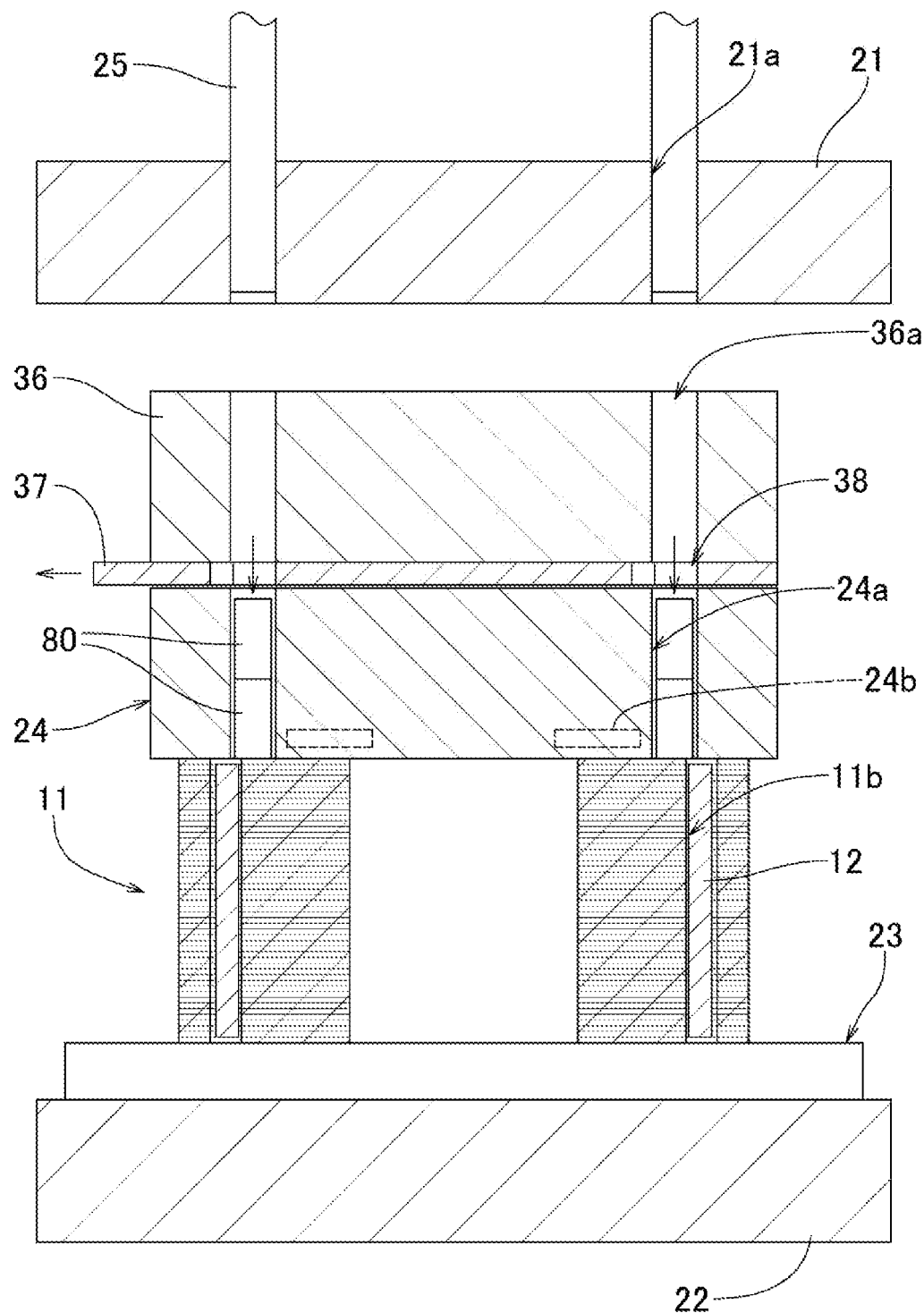
FIG. 14 is a view of illustrating a state where the resin tablet moves to the heating unit of the molding device in the core unit manufacturing apparatus according to the first embodiment of the present disclosure.
Figure 15:
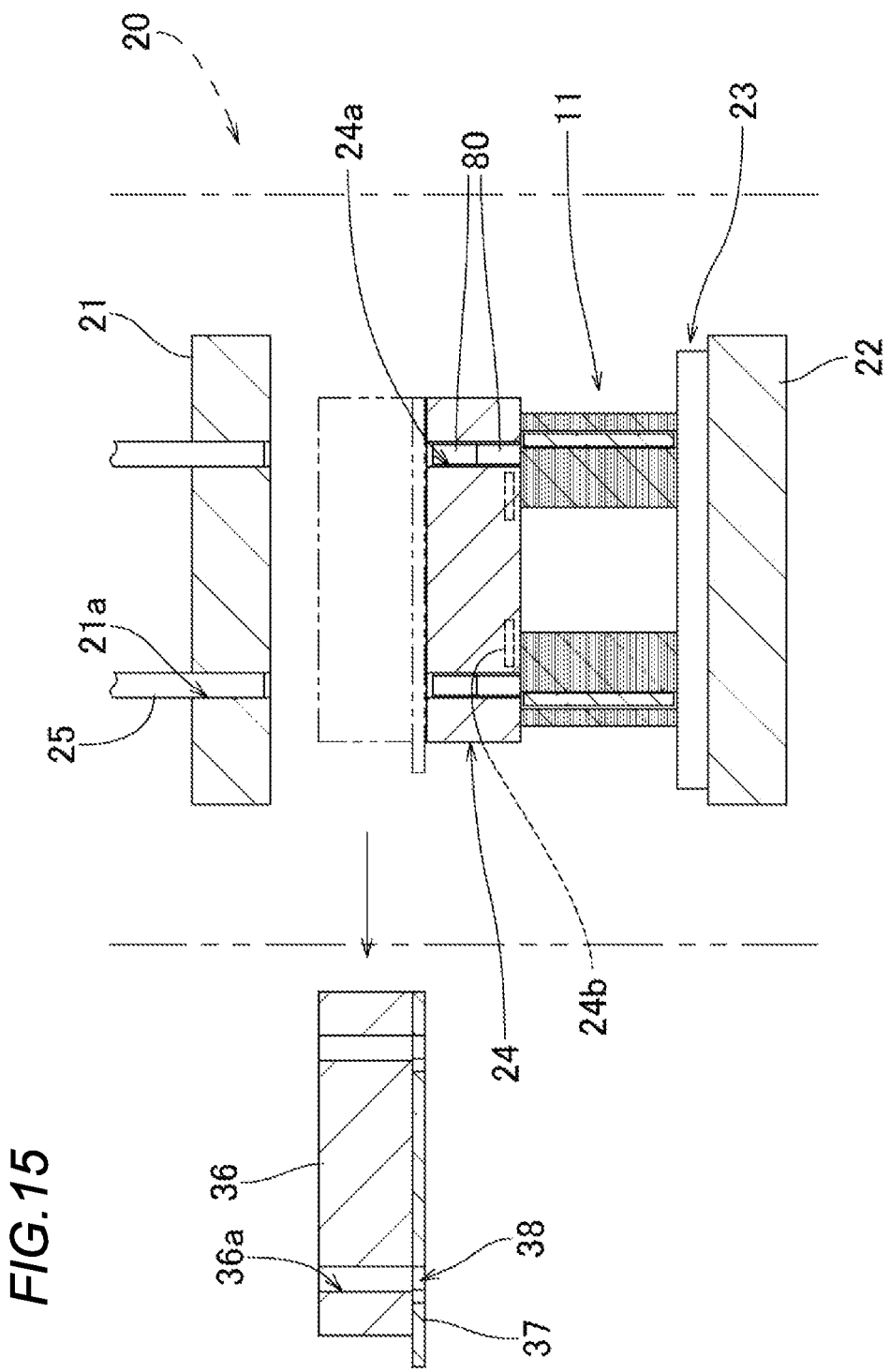
FIG. 15 is a view of illustrating a state where the carrying unit and the opening and closing member of the resin transfer unit retract to the outside of the molding device in the core unit manufacturing apparatus according to the first embodiment of the present disclosure.

As shown in FIGS. 1 and 12, the core transfer unit 40 has each function that makes it possible to move the core body 11 placed on the jig 23 with the jig 23 in the front-rear direction (approaching and separating directions) of the molding device 20 between the side position on the side surface where the opening part for carrying in the core body of the molding device 20 is present and the predetermined position below the heating unit 24 between the upper and lower dies of the molding device 20, carry the core body 11 and the jig 23 carried in and out of the molding device 20, and move the core body 11 and the jig 23 supplied for filling the resin from the preheating device or the like to the side position of the molding device 20 where carrying the core body 11 and the jig 23 in and out of the molding device 20 is possible, along the alignment direction of the molding devices 20.

The core transfer unit 40, for example, includes: a main transfer mechanism 41 that can grip and release the jig 23 on which the core body 11 is placed, can move the gripping part back and forth with respect to the molding device 20 integrally with the jig 23 gripped by the gripping part and the core body 11, and can carry the jig 23 and the core body 11 in and out of the upper and lower dies of the molding device 20; and a sub-transfer mechanism 42 that can move the main transfer mechanism 41 laterally on the guide rail continuous along the alignment direction of the molding devices 20, and can move the jig 23 and the core body 11, which are held by the main transfer mechanism 41, for each main transfer mechanism 41.

In other words, the sub-transfer mechanism 42 can move the core body 11 and the jig 23 before being carried into the molding device 20 and after being carried out of the molding device 20 along the alignment direction of the molding devices 20, and further, at the side position of each of the molding devices 20 in the sub-transfer mechanism 42, the main transfer mechanism 41 can carry the core body 11 and the jig 23 in and out of each of the molding devices 20.

When the sub-transfer mechanism 42 is provided so that a part of the path for moving the core body 11 and the jig 23 is positioned in the vicinity of the preheating device 50 that preheats the core body 11 (refer to FIG. 1), the core transfer unit 40 can carry the preheated core body 11 out of the preheating device 50, moves the preheated core body 11 to the side of each molding device 20, and carry the core body 11 into the molding device 20.

Next, the manufacturing process of the core unit using the core unit manufacturing apparatus according to the embodiment will be described.

As a precondition, it is assumed that the core body 11 is obtained in advance by laminating the plurality of thin plates 11a punched out of thin plate material using a known manufacturing method. Then, in a state where the permanent magnet 12 is inserted into the magnet insertion hole 11b, heated by the preheating device 50, and preheated to an appropriate temperature, the core body 11 can move toward the molding device 20 by the core transfer unit 40 together with the jig 23 on which the core body 11 is placed.

In a state of being held by the main transfer mechanism 41 of the core transfer unit 40, the core body 11 and the jig 23 on which the core body 11 is placed sequentially move along the alignment direction of the molding device 20 by the operation of the sub-transfer mechanism 42.

When the core body 11 and the jig 23 reach the side of the molding device 20 (refer to FIG. 1), as a core carrying-in step, the main transfer mechanism 41 of the core transfer unit 40 moves the core body 11 and the jig 23 from the side position of the molding device 20 to a predetermined position under the heating unit 24 between the upper and lower dies of the molding device 20 through the opening part for carrying the core body in and out of the side surface of the molding device 20.

When the main transfer mechanism 41 of the core transfer unit 40 releases, from the holding, the jig 23 on which the core body 11 is placed, and places the jig 23 on which the core body 11 is placed on the lower die, carrying the core body 11 and the jig 23 into the molding device 20 is completed (refer to FIG. 12). After finishing the carrying-in, the main transfer mechanism 41 of the core transfer unit 40 retracts out of the molding device 20 and is used to move the new core body 11 and the jig 23.

Meanwhile, the resin tablets 80 are aligned in a predetermined direction in the material supply unit 31, and are sequentially carried one or more at a time toward the disposition mechanism 32 (refer to FIG. 4).

The resin tablet 80 is moved by the material supply unit 31 to the upper part of the disposition unit 33 of the disposition mechanism 32 and positioned above the predetermined accommodation hole 33a of the disposition unit 33.

The material supply unit 31 then releases the resin tablet 80 above the accommodation hole 33a. The released resin tablet 80 is fed into the predetermined accommodation hole 33a of the disposition unit 33 and accommodated therein.

In a case where one or more resin tablets 80 to be accommodated are accommodated in one accommodation hole 33a, the disposition unit 33 may be rotated by a predetermined angle around the center axis so that the other accommodation hole 33a, where the resin tablets 80 are scheduled to be fed and accommodated next, corresponds to the position where the resin tablets 80 are released by the material supply unit 31. (refer to FIG. 4).

When one or more resin tablets 80 are accommodated in all of the accommodation holes 33a of the disposition unit 33, the carrying unit 36, and the opening and closing member 37 of the carrying mechanism 35 are positioned above the disposition unit 33 (refer to FIG. 5), and each of the accommodation holes 36a of the carrying unit 36 is positioned above each of the accommodation holes 33a of the disposition unit 33. Then, the opening and closing member 37 is in a state where the first hole portion 38a is at the first position that overlaps the accommodation hole 36a of the carrying unit 36, with respect to the carrying unit 36 (refer to FIG. 10).

In this state, the disposition unit 33 moves upward to bring the upper surface thereof closer to the lower surface of the opening and closing member 37 (refer to FIG. 6), and further, each of the raising and lowering units 34 is operated to raise the tip part thereof. Accordingly, one or more resin tablets 80 in the accommodation hole 33a of the disposition unit 33 come out of the accommodation hole 33a, move into the accommodation hole 36a of the carrying unit 36, and are accommodated (refer to FIG. 7).

Figure 8:
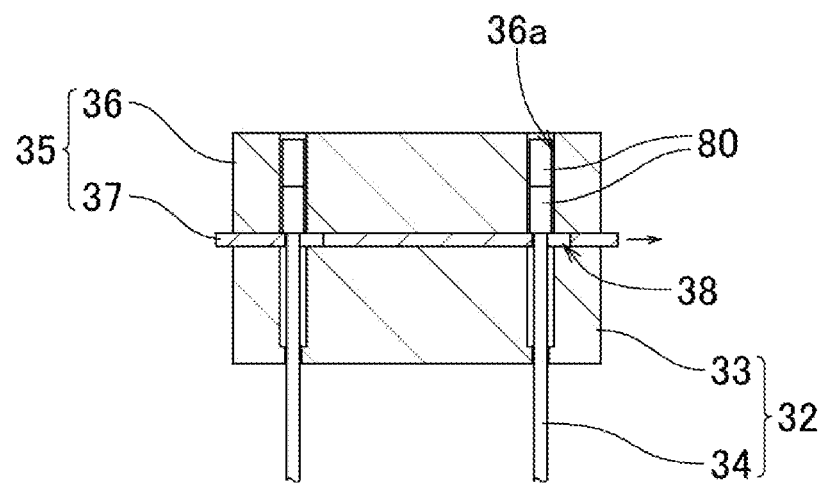
FIG. 8 is a view of illustrating a moving state of the opening and closing member to the carrying unit in the resin transfer unit of the core unit manufacturing apparatus according to the first embodiment of the present disclosure.
Figure 9:
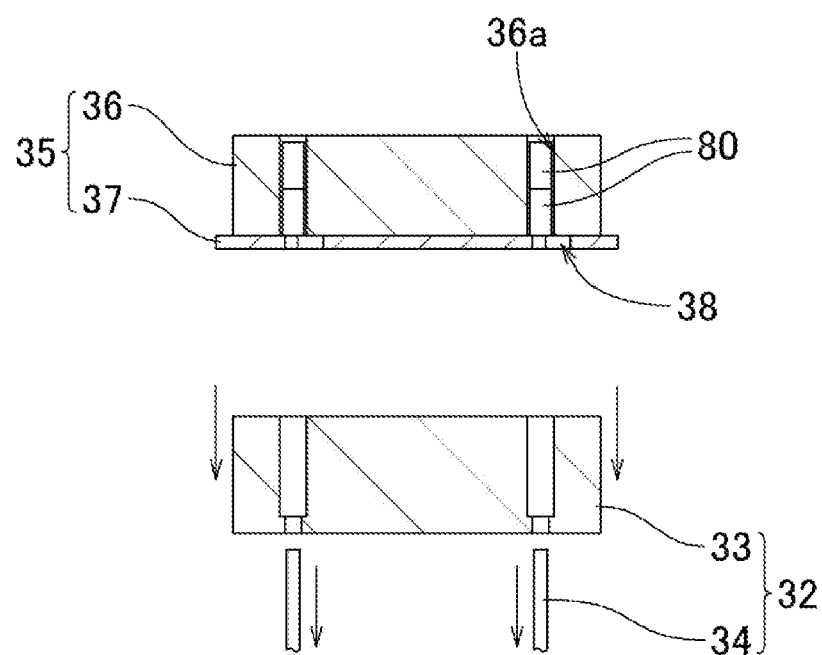
FIG. 9 is a view of illustrating a moving state below the disposition mechanism in the resin transfer unit of the core unit manufacturing apparatus according to the first embodiment of the present disclosure.

Next, the opening and closing member 37 is shifted to a state where the second hole portion 38b is at the second position that overlaps the accommodation hole 36a of the carrying unit 36, with respect to the carrying unit 36 (refer to FIGS. 8 and 11). The raising and lowering unit 34 lowers the tip part thereof and returns to the initial position below the disposition unit 33, and the disposition unit 33 also moves downward to return to the initial position (refer to FIG. 9).

The resin tablet 80 accommodated in the accommodation hole 36a of the carrying unit 36 does not drop through the second hole portion 38b of the through hole 38 smaller than the resin tablet 80, but is supported from below by the opening and closing member 37. In this manner, the resin tablet 80 is held by the carrying unit 36 and the opening and closing member 37, and can be moved to the molding device 20 together with the carrying unit 36 and the opening and closing member 37.

The carrying unit 36 and the opening and closing member 37 that hold the resin tablet 80 are moved in the lateral direction from above the disposition mechanism 32 to the side position of the molding device 20 (refer to FIG. 1). After this movement, the carrying unit 36 and the opening and closing member 37 move forward from the side position to the upper position of the heating unit 24 through the opening part for carrying the resin material into the side surface of the molding device 20 as the step of carrying the resin tablet 80 into the molding device 20 (refer to FIG. 13).

In this manner, when the carrying unit 36 and the opening and closing member 37 reach the upper position of the heating unit 24, it is preferable to operate the heater 24b of the heating unit 24 to preheat the heating unit 24 to a predetermined temperature.

When the carrying unit 36 and the opening and closing member 37 are positioned above the heating unit 24 and each of the accommodation holes 36a of the carrying unit 36 is positioned above each of the accommodation holes 24a of the heating unit 24, the opening and closing member 37 moves against the carrying unit 36 to the first position where the first hole portion 38a thereof overlaps the accommodation hole 36a of the carrying unit 36. Accordingly, one or more resin tablets 80 in each of the accommodation holes 36a of the carrying unit 36 come out of the accommodation holes 36a, are fed into the accommodation holes 24a of the heating unit 24, and are accommodated (refer to FIG. 14).

Accordingly, the heating of the resin tablet 80 accommodated in each of the accommodation holes 24a is started. In each of the accommodation holes 24a, the resin tablet 80 heated by the heat of the heater 24b melts and becomes the molten resin 81.

After the resin transfer step in which the resin tablet 80 comes out of the accommodation hole 36a and the resin tablet 80 is supplied to the heating unit 24 is completed, together with the opening and closing member 37, the carrying unit 36 retracts from the upper part of the heating unit 24 to the outside of the molding device (refer to FIG. 15), and the carrying unit 36 further moves in the lateral direction, returns to the upper position of the disposition mechanism 32, and supplies the resin tablet 80 to the accommodation hole 24a as the resin transfer step again.

After the carrying unit 36 and the opening and closing member 37 retract from the upper part of the heating unit 24, by lowering the upper die 21 or by raising the lower die 22 on which the core body 11 is placed, the state is shifted to a state where the core body 11 is sandwiched and pressed by the upper die 21 and the lower die 22 (refer to FIG. 16).

In this state, on both end surfaces of the core body 11 in the axial direction, by making the heating unit 24 and the jig 23 abut against each other and pressing the heating unit 24 and the jig 23, all end portions of the core body 11 in the axial direction can be closed except for the remaining part (space portion) of the magnet insertion hole 11b other than the part where the permanent magnet 12 exists.

After each of the magnet insertion holes 11b of the core body is closed from the outside by the molding device 20, the molding step is executed to inject the molten resin 81.

Here, for the molten resin 81 in each of the accommodation holes 24a of the heating unit 24, each of the extrusion units 25 reaches the accommodation hole 24a of the heating unit 24 through the through hole 21a of the upper die 21 and is inserted into the accommodation hole 24a. Accordingly, the molten resin 81 is extruded from the accommodation hole 24a to the magnet insertion hole 11b of the lower core body 11 by the extrusion unit 25 (refer to FIG. 17). In this manner, the molten resin 81 is injected and filled into the magnet insertion hole 11b.

When the molten resin 81 that fills each of the magnet insertion holes 11b is solidified, the extrusion unit 25 is pulled up to return to the original state thereof, and by raising the upper die 21 or lowering the lower die 22 to separate the upper die 21 from the heating unit 24, the pressing of the heating unit 24 onto the core body 11 is completed, and thus, the core body 11 and the jig 23 can be carried out from between the upper and lower dies.

After this, the main transfer mechanism 41 of the core transfer unit 40 is moved to the side position of the molding device 20, and further, as the core carrying-out step, the main transfer mechanism 41 is introduced to the space between the upper and lower dies of the molding device 20, the jig 23 and the resin-filled core body 11 placed on the jig 23 are held by the main transfer mechanism 41. Then, the main transfer mechanism 41 moves the core body 11 and the jig 23 out of the molding device 20 from between the heating unit 24 and the lower die 22, and the core body 11 and the jig 23 are carried out of the molding device 20.

In a state where the core body 11 and the jig 23 carried out of the molding device 20 are held by the main transfer mechanism 41 of the core transfer unit 40, after being moved further along the alignment direction of the molding device 20 by the operation of the sub-transfer mechanism 42, the core body 11 and the jig 23 are taken out of the core transfer unit 40 and transferred to the next step.

After the resin tablet 80 and the core body 11 are carried into one of the molding devices 20, while the resin tablet 80 is melted in one of the molding devices 20 to become the molten resin 81 and the molten resin 81 is injected into and fills the magnet insertion hole 11b of the core body 11, when carrying the resin tablet 80 and the core body 11 into the other arranged molding device respectively by the resin transfer unit 30 and the core transfer unit 40, the plurality of molding devices 20 are alternately operated to efficiently proceed with resin filling into the core body 11.

In this manner, in the core unit manufacturing apparatus according to the embodiment, the core transfer unit 40 that carries in and out the core body 11 and the resin transfer unit 30 that transfers and supplies the resin tablet 80 can carry in and out the core body 11 and supply the resin tablet 80 respectively from different directions, to the molding device 20, and inject the molten resin into the magnet insertion hole 11b of the core body 11 by the molding device 20. Accordingly, each movement path of the core body 11 and the resin tablet 80 to the molding device 20 can be simplified, the structure of the molding device 20 or each transfer unit does not need to be complicated, the manufacturing cost can be suppressed, and the maintainability can be improved. In addition, as the movement paths of the core body 11 and the resin tablet 80 to the molding device 20 do not overlap each other, for example, the resin material supply for supplying the resin material to the heating unit in the molding device and the setting of the core body in the molding device can be executed before and after without a time interval, the resin can fill the space portion of the core body before the resin melted by the heating by the heating unit is solidified, and the quality of the resin that has filled the space portion can be ensured.

In the core unit manufacturing apparatus according to the embodiment, in the molding device 20, in a state where the heating unit 24 that accommodates the molten resin 81 and the core body 11 directly abut against each other, the molten resin 81 is extruded from the heating unit 24, and the molten resin 81 is injected into the magnet insertion hole 11b of the core body 11. However, the present disclosure is not limited thereto, and a configuration may be employed in which a plate-shaped cull plate having recess portions or through holes that serve as resin flow paths that can communicate with the magnet insertion holes 11b of the core body 11 is attached to the upper side of the core body 11, and the molten resin 81 extruded from the heating unit 24 is injected into the magnet insertion hole 11b of the core body 11 through the cull plate.

In this case, after the molten resin 81 is solidified, the remaining part of this solidified resin at the upper part of the core body can be removed by removing the plate, and it becomes easier to remove the unnecessary resin.

Second Embodiment of Present Disclosure

In the core unit manufacturing apparatus according to the first embodiment, the heating unit 24 is provided between the upper and lower dies of the molding device 20. However, the present disclosure is not limited thereto, and as the second embodiment, as shown in FIGS. 20 to 25, a heater 27b can be provided in the lower die 27 of the molding device 20 to serve as the heating unit.

In this case, similar to the first embodiment, the core unit manufacturing apparatus 1 according to the embodiment includes the molding device 20, the resin transfer unit 30, and the core transfer unit 40, but differs in that the molding device 20 melts the resin tablet 80 in the lower die 27 and injects the molten resin to the core body 11 from the lower die 27 side. The resin transfer unit 30 and the core transfer unit 40 have the same configuration as that in the first embodiment, and the detailed description thereof will be omitted.

Figure 24:
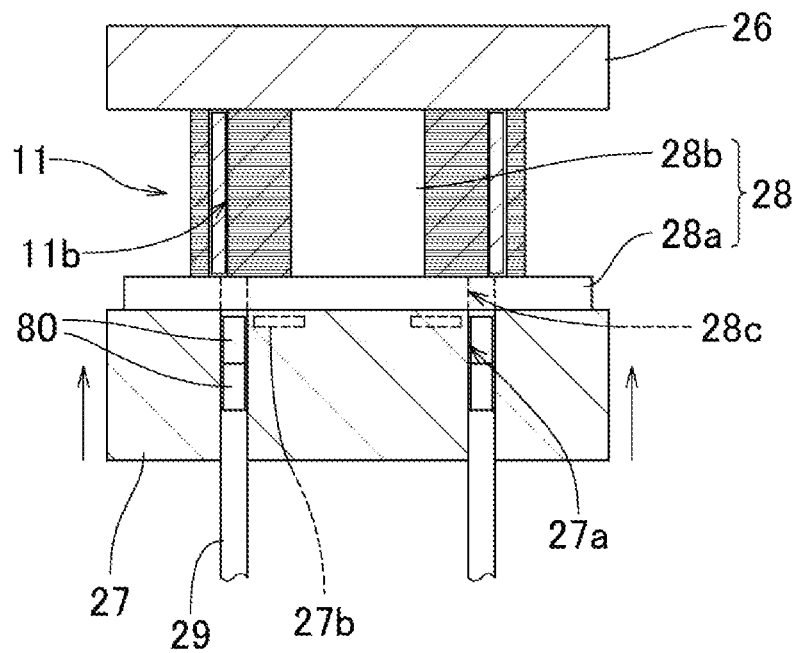
FIG. 24 is a view of illustrating a state where the core body is pressed by an upper die and a lower die of the molding device in the core unit manufacturing apparatus according to the second embodiment of the present disclosure.

Similar to the first embodiment, the molding device 20 includes the upper die 26, the lower die 27, a jig 28, and an extrusion unit 29, but differs in that, as shown in FIG. 24, the lower die 27 also serves as a heating unit, accommodates the resin tablet 80, and heats the resin tablet 80.

Similar to the first embodiment, the upper die 26 sandwiches the core body 11 and the jig 28 with the lower die 27, and applies a predetermined load to the core body 11 in the height direction. Except that a hole through which the upper die 26 penetrates is not provided, the upper die 26 has the same configuration as that in the first embodiment, and the detailed description thereof will be omitted.

Similar to the first embodiment, the lower die 27 is used to support the core body 11 and the jig 28, but differs in that the plurality of accommodation holes 27a disposed corresponding to the plurality of magnet insertion holes 111b of the core body 11 are provided and the heater 27b that heats the lower die 27 is provided.

Each of the accommodation holes 27a of the lower die 27 is continuous in the height direction of the lower die 27, and each can accommodate at least one resin tablet. When the plurality of resin tablets 80 are accommodated in the accommodating hole 27a, the resin tablets 80 are accommodated in the hole in a state of being aligned in a row in the continuous hole direction.

The heater 27b heats the lower die 27 and is capable of heating the resin tablet 80 accommodated in each of the accommodation holes 27a. When the resin tablet 80 is heated by the heater 27b, the resin tablet 80 melts and becomes the molten resin 81. The heater 27b is not limited to the configuration of being disposed inside the lower die 27, but may also be disposed outside the lower die 27.

Similar to the first embodiment, the jig 28 includes a base member 28a and an insertion post 28b, but differs in that the base member 28a has a plurality of through holes 28c that penetrate therethrough. The plurality of through holes 28c in the base member 28a are continuous in the height direction of the base member 28a and are disposed corresponding to the plurality of magnet insertion holes 11b in the core body 11 and each of the accommodation holes 27a in the lower die 27.

Figure 25:
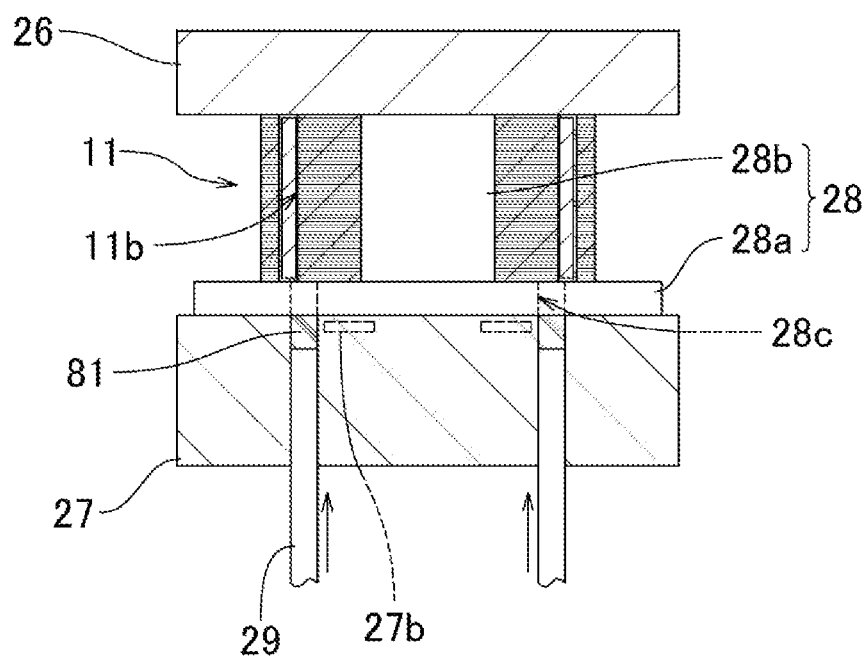
FIG. 25 is a view of illustrating a state where a molten resin is injected by the molding device in the core unit manufacturing apparatus according to the second embodiment of the present disclosure.

As shown in FIG. 25, the extrusion unit 29 can extrude the molten resin 81 to the magnet insertion hole 11b of the core body 11, and for example, is configured as a plurality of plungers that can be moved up and down by the driving by a predetermined driving source.

Each of the extrusion units 29 is disposed to be insertable into the accommodation hole 27a of the lower die 27 from below. Each of the extrusion units 29 can be driven by a corresponding driving source for each extrusion unit to be movable up and down, or a plurality of extrusion units can be driven together by a single driving source to be integrally movable up and down.

Next, the manufacturing process of the core unit using the core unit manufacturing apparatus according to the embodiment will be described.

As a precondition, similar to the first embodiment, the core body 11 in which the plurality of thin plates 11a are laminated in advance is obtained, and in a state where the permanent magnet 12 is inserted into the magnet insertion hole 11b and preheated by the preheating device 50, the core body 11 can move toward the side of the molding device 20 by the core transfer unit 40 together with the jig 23 on which the core body 11 is placed.

First, the transfer and supply of the resin tablet 80 to the molding device 20 as the resin transfer step by the resin transfer unit 30 are executed prior to the carrying-in of the core body 11 and the jig 28 to the molding device 20 as the core carrying-in step by the core transfer unit 40.

The process from a state where one or more resin tablets 80 are fed by the material supply unit 31, released on the accommodation hole 33a of the disposition unit 33 of the disposition mechanism 32, and put into the accommodation hole 33a, and all of the resin tablets 80 are accommodated in each of the accommodation holes 33a, to the state where the resin tablets 80 move to the carrying unit 36 and the opening and closing member 37 and toward the molding device 20 while maintaining a state of being accommodated in the accommodation hole 36a by moving to each of the accommodation holes 36a of the carrying unit 36 of the carrying mechanism 35 and further moving to the second position against the accommodation holes 36a of the opening and closing member 37 following the upward movement of the disposition unit 33 and the raising of the tip parts of the each of the raising and lowering units 34, is similar to that in the first embodiment.

The carrying unit 36 and the opening and closing member 37 that hold the resin tablet 80 are moved in the lateral direction from above the disposition mechanism 32 to the side position of the molding device 20. After this movement, as the step of carrying the resin tablet 80 into the molding unit 20, the carrying unit 36 and the opening and closing member 37 move from the side position to the upper side of the lower die 27 through the opening part for carrying the resin material into the side surface of the molding device 20 (refer to FIG. 20).

In this manner, when the carrying unit 36 and the opening and closing member 37 reach the upper side of the lower die 27, it is preferable to operate the heater 27b of the lower die 27 to preheat the lower die 27 to a predetermined temperature.

When the carrying unit 36 and the opening and closing member 37 are positioned above the lower die 27 and each of the accommodation holes 36a of the carrying unit 36 is positioned above each of the accommodation holes 27a of the lower die 27, the opening and closing member 37 moves against the carrying unit 36 to the first position where the first hole portion 38a overlaps the accommodation hole 36a of the carrying unit 36. Accordingly, one or more resin tablets 80 in each of the accommodation holes 36a of the carrying unit 36 come out of the accommodation holes 36a, are fed into the accommodation holes 27a of the lower die 27, and are accommodated (refer to FIG. 21).

Accordingly, the heating of the resin tablet 80 accommodated in each of the accommodation holes 27a is started. In each of the accommodation holes 27a, the resin tablet 80 heated by the heat of the heater 27b melts and becomes the molten resin 81.

After the resin transfer step in which the resin tablet 80 comes out of the accommodation hole 36a and the resin tablet 80 is supplied to the lower die 27 is completed, together with the opening and closing member 37, the carrying unit 36 retracts from the upper side of the lower die 27 to the outside of the molding device 20 (refer to FIG. 22), and the carrying unit 36 further moves in the lateral direction, returns to the upper position of the disposition mechanism 32, and supplies the resin tablet 80 to the accommodation hole 27a as the resin transfer step again.

Meanwhile, in a state of being held by the main transfer mechanism 41 of the core transfer unit 40, the core body 11 and the jig 28 on which the core body 11 is placed move along the alignment direction of the molding device 20 by the operation of the sub-transfer mechanism 42, reaches the side of the molding device 20, and stops.

After the carrying unit 36 and the opening and closing member 37 of the resin transfer unit 30 retract from the upper side of the lower die 27, the main transfer mechanism 41 of the core transfer unit 40 moves the core body 11 and the jig 28 from the side position of the molding device 20 to a predetermined position on the lower die 27 between the upper and lower dies of the molding device 20 through the opening part for carrying the core body in and out of the side surface of the molding device 20.

Figure 23:
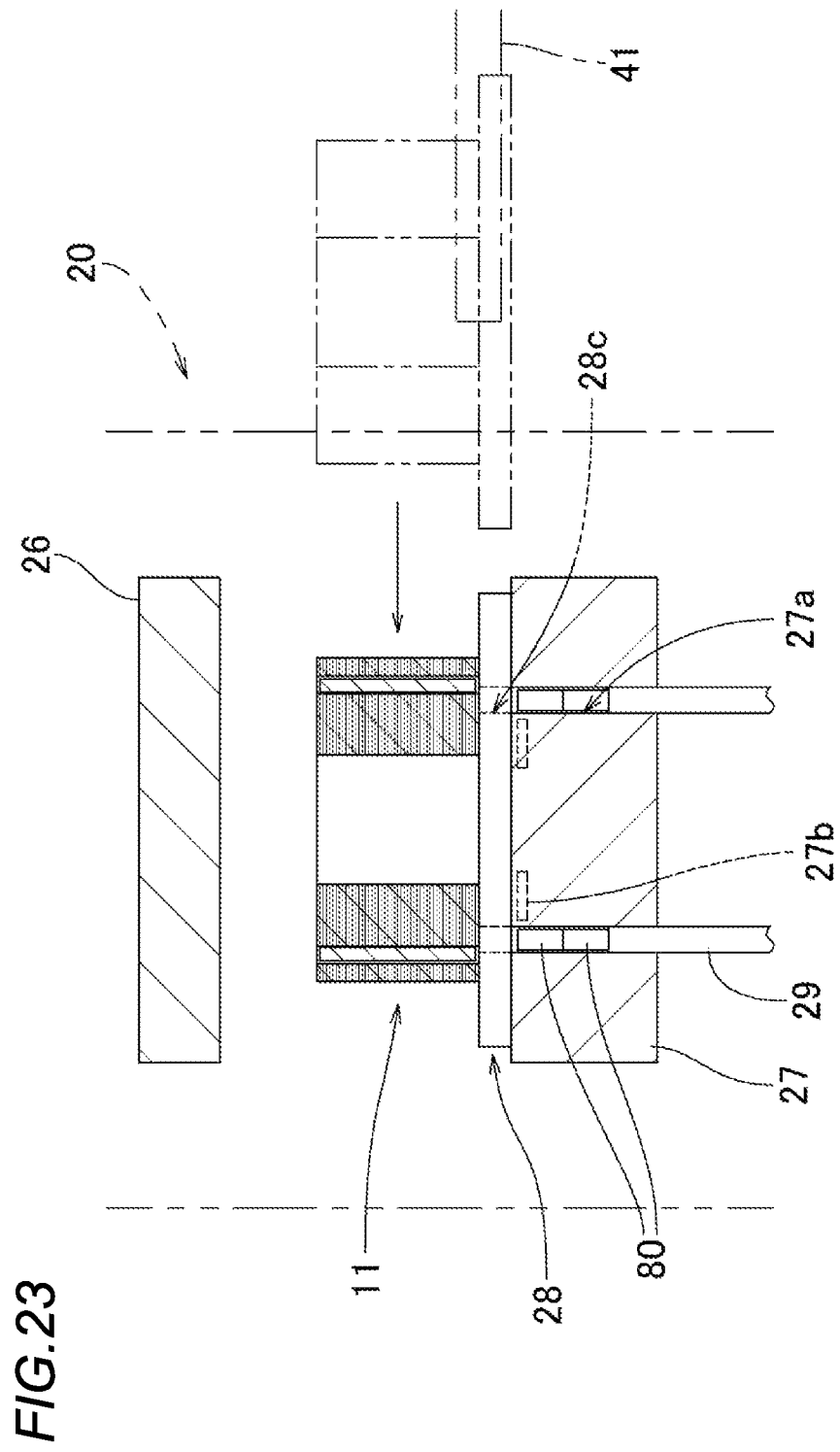
FIG. 23 is a view of illustrating a state where a core body is carried into the molding device in the core unit manufacturing apparatus according to the second embodiment of the present disclosure.

When the main transfer mechanism 41 of the core transfer unit 40 releases the jig 28 on which the core body 11 is placed and places the jig 28 on which the core body 11 is placed on the lower die, the core carrying-in step of carrying the core body 11 and the jig 28 into the molding device 20 is completed (refer to FIG. 23). After finishing the carrying-in, the main transfer mechanism 41 of the core transfer unit 40 retracts out of the molding device 20 and is used to move the new core body 11 and the jig 28.

After the core body 11 and the jig 28 are placed on the lower die 27, by lowering the upper die 26 or by raising the lower die 27 on which the core body 11 is placed, and the core body 11 is sandwiched and pressed by the upper die 26 and the lower die 27 (refer to FIG. 24).

On both end surfaces of the core body 11 in the axial direction, by making the upper die 26 and the jig 28 abut against each other and pressing the upper die 26 and the jig 28, all end portions of the core body 11 in the axial direction can be closed except for the remaining part (space portion) of the magnet insertion hole 11b.

After each of the magnet insertion holes 11b of the core body 11 is closed from the outside by the molding device 20, the molding step of injecting the molten resin 81 is executed.

Here, for the molten resin 81 in each of the accommodation holes 27a of the lower die 27, each of the extrusion units 29 reaches each of the accommodation holes 27a of the lower die 27 from below and is inserted into each of the accommodation holes 27a. Accordingly, the molten resin 81 is extruded from the accommodation hole 27a to the magnet insertion hole 11b of the upper core body 11 through the through hole 28c of the jig 28 by the extrusion unit 29 (refer to FIG. 25). In this manner, the molten resin 81 is injected and filled into the magnet insertion hole 11b.

When the molten resin 81 that fills each of the magnet insertion holes 11b is solidified, the extrusion unit 29 is lowered to return to the original state thereof, and by raising the upper die 26 or by lowering the lower die 27 to separate the upper die 26 from the core body 11, the pressing of the upper die 26 onto the core body 11 is completed, and the core body 11 and the jig 28 can be carried out from between the upper and lower dies.

After this, as the core carrying-out step, the main transfer mechanism 41 of the core transfer unit 40 is moved to the side position of the molding device 20, and further, the main transfer mechanism 41 is introduced to the space between the upper and lower dies of the molding device 20, the jig 28 and the resin-filled core body 11 placed on the jig 28 are held by the main transfer mechanism 41. Then, the main transfer mechanism 41 moves the core body 11 and the jig 28 out of the molding device 20 from between the upper die 26 and the lower die 27, and the core body 11 and the jig 28 are carried out of the molding device 20.

In a state where the core body 11 and the jig 28 carried out of the molding device 20 are held by the main transfer mechanism 41 of the core transfer unit 40, after being moved further along the alignment direction of the molding device 20 by the operation of the sub-transfer mechanism 42, the core body 11 and the jig 28 are taken out of the core transfer unit 40 and transferred to the next step.

In a case of the core unit manufacturing apparatus according to the embodiment, the resin transfer unit 30, which supplies the resin tablet 80 to the molding system 20, and the core transfer unit 40, which carries in and out the core body 11, both reach the upper side of the lower die 27 between the upper and lower dies of the molding system 20, and most of the height positions of the paths for moving the resin tablet 80 or the core body 11 overlap each other. However, since the resin transfer unit 30 and the core transfer unit 40 supply the resin tablet 80 and carry the core body 11 at different times from two different directions in and out of the molding device 20, these operations can be executed without any problems, it is possible to ensure that the step of injecting the resin into the core body 11 by the molding device 20 proceeds efficiently and smoothly.

Third Embodiment of Present Disclosure

Figure 26:
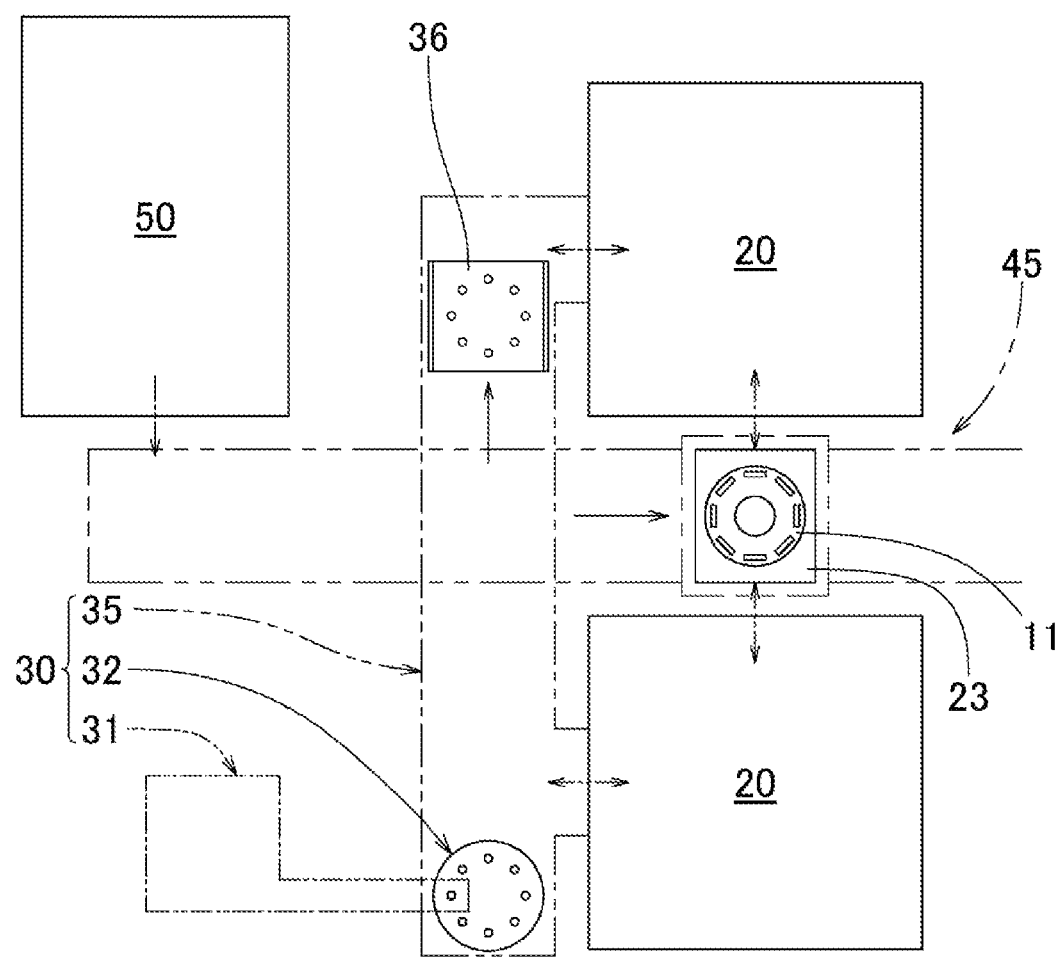
FIG. 26 is a schematic plan view of a core unit manufacturing apparatus according to a third embodiment of the present disclosure.

In the core unit manufacturing apparatus according to the first embodiment, the resin transfer unit 30 and the core transfer unit 40 are provided on the sides of two facing side surfaces of the molding device 20, and are separated from each other through the molding device 20. However, the present disclosure is not limited thereto, and as the third embodiment, as shown in FIG. 26, a configuration can be employed in which the resin transfer unit 30 and the core transfer unit 45 are provided respectively on the side of each side surface where the two side surfaces of the molding device 20 form a right-angle disposition relationship.

In this case, for the plurality of molding devices 20, the resin transfer unit 30 can move the resin tablet 80 as the resin material along the alignment direction of the molding devices 20, and the resin tablet 80 moved to the side of each of the molding devices can be supplied between the upper and lower dies of the molding devices 20.

On the other hand, the core transfer unit 45 is arranged to be sandwiched by the molding devices 20, and can move the core body 11 before being carried into the molding device 20 and after being carried out of the molding devices 20 in the direction perpendicular to the alignment direction of the molding devices 20, and by moving the core body 11 respectively to be close to one molding device 20 and separated from the other molding device 20 between the molding devices 20, it is possible to carry the core body 11 in and out from between the upper and lower dies of each of the molding devices 20.

In the core unit manufacturing apparatus according to the embodiment, the movement path of the resin tablet 80 by the resin transfer unit 30 and the movement path of the core body 11 by the core transfer unit 45 partially intersect with each other. However, when the resin transfer unit 30 and the core transfer unit 45 are disposed so that the heights of the movement path of the resin tablet 80 and the movement path of the core body 11 are different from each other, similar to each of the embodiments, it is possible to ensure that the step of injecting the resin into the core body 11 by the molding device 20 can proceed efficiently and smoothly.

Figure 27:
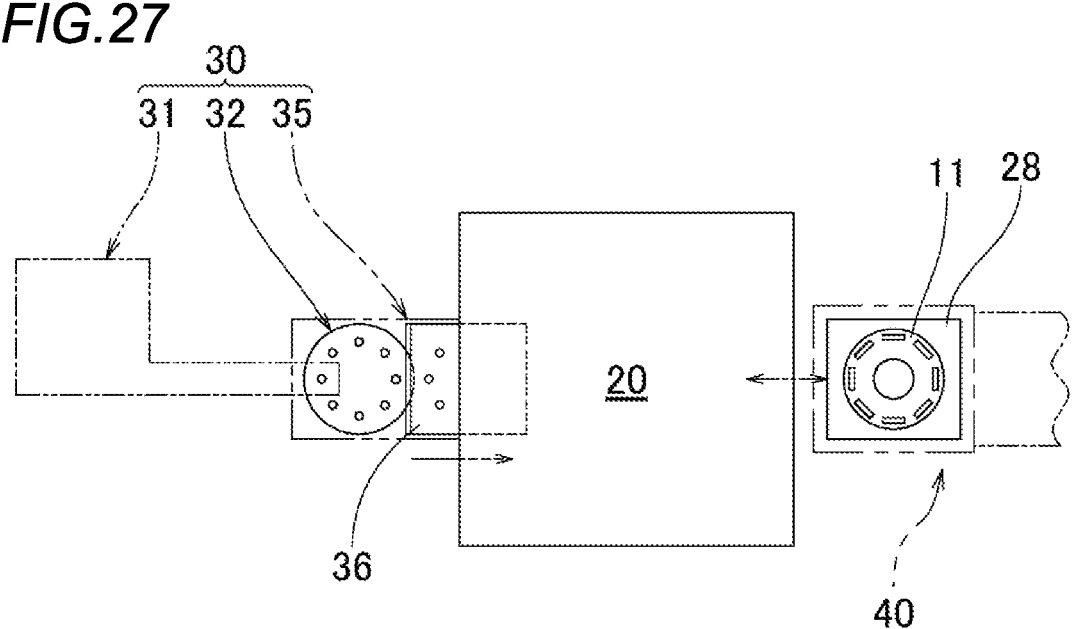
FIG. 27 is a schematic plan view of a first example of a core unit manufacturing apparatus according to another embodiment of the present disclosure.
Figure 28:
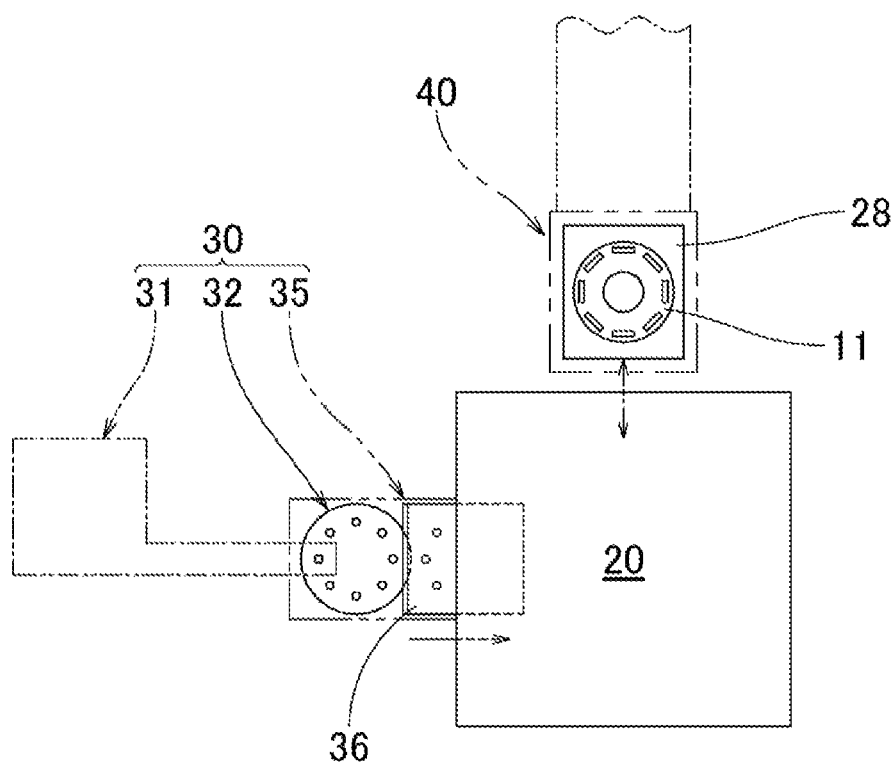
FIG. 28 is a schematic plan view of a second example of a core unit manufacturing apparatus according to another embodiment of the present disclosure.

In the core unit manufacturing apparatus according to each of the embodiments, the plurality of molding devices 20 are disposed. However, the present disclosure is not limited thereto, and as shown in FIGS. 27 and 28, a configuration may also be employed in which only one molding device 20 is used to make it possible to inject the resin into the core body 11.

In this case, it is not necessary to provide a transfer mechanism that can move the resin material along the alignment direction of the molding device in the resin transfer unit 30, and a sub-transfer mechanism that can move the core body along the alignment direction of the molding device in the core transfer unit 40, that can simplify the device configuration.

In the core unit manufacturing apparatus according to each of the embodiments, the resin tablet 80 is used as the resin material to be injected into the core body 11 in the molding device 20. However, the present disclosure is not limited thereto, and a configuration may be employed in which other forms of resin material, such as powder having the same components as the tablet, is used.

Furthermore, in the core unit manufacturing apparatus according to each of the above-described embodiments, in the molding device 20, the resin tablet 80 is melted as the resin material fed into the heating unit 24 or the lower die 27, the molten resin 81 is extruded from the heating unit 24 or the lower die 27, and the molten resin 81 is injected into and fills the magnet insertion hole 11b where the permanent magnet 12 is already inserted and disposed in the core body 11. However, the present disclosure is not limited thereto, and a configuration may be employed in which the molding device feeds the supplied resin material, for example, a granulated, powdered, or tablet-shaped resin material, into the magnet insertion hole 11b of the core body 11, and melts the resin material fed into the magnet insertion hole 11b, and after the resin material is fed into the magnet insertion hole 11b, before the resin material is melted or during the melting, the permanent magnet 12 is inserted into the magnet insertion hole 11b. The resin material may be melted by inserting the heated permanent magnet 12 into the magnet insertion hole 11b, in addition to melting the core body 11 by heating.

In this case, before inserting or after putting the permanent magnet 12, by melting the resin material in the magnet insertion hole 11b, it is possible to fill the remaining part other than the permanent magnet 12 in the magnet insertion hole 11b as the space portion with resin, and finally, the permanent magnet 12 is fixed to the core body 11 by the solidified resin.

In the embodiment, in the molding device, the mold that sandwiches the core body is described as an upper die and a lower die, but this is only for convenience and does not limit the scope of the right. In other words, as long as the molding device sandwiches the core body by the pair of molds from both sides in the axial direction and fills the core body with resin, the molds may be disposed in any manner, and for example, the molds may be disposed so that the core body is sandwiched between the left and right molds.

What is claimed is:

1. A core unit manufacturing method for manufacturing a core unit of a stator or a rotor in a rotating electric machine, the core unit being formed by filling a resin into a space portion provided as a target for filling the resin in a core body formed by laminating a plurality of thin plates made of a magnetic metal material, the method comprising:
    transferring, in a resin transfer stage, a resin material to a molding device to supply the resin material thereto by a resin transfer unit;
    carrying, in a core carrying-in stage, the core body into a part between a pair of dies of the molding device by a core transfer unit;
    filling, in a molding stage, the space portion in the core body with resin by the molding device; and
    carrying, in a core carrying-out stage, the core body out of the part between the pair of dies of the molding device by the core transfer unit, wherein
    the supplying of the resin material to the molding device by the resin transfer unit and the carrying of the core body in and out of the molding device by the core transfer unit are respectively performed from two side positions having different directions to the molding device.

2. The core unit manufacturing method according to claim 1, wherein
    the molding stage includes filling the space portion with the molten resin by the molding device.

3. The core unit manufacturing method according to claim 1, wherein
    the core unit is the rotor of the rotating electric machine, being formed to fix a permanent magnet to a magnet insertion hole provided in the core body,
    the space portion is at least one part of the magnet insertion hole,
    the molding stage includes, by the molding device, feeding the supplied resin material into the magnet insertion hole of the core body, melting the fed resin material, and filling the space portion with the resin, and
    the core unit manufacturing method further comprises inserting the permanent magnet into the magnet insertion hole, after feeding the resin material into the magnet insertion hole, and before or while melting the resin material in the molding stage.

4. The core unit manufacturing method according to claim 1, wherein
    the molding device is configured from a plurality of molding devices,
    the resin transfer unit includes a carrying mechanism that is capable of moving the resin material at least along a direction in which the molding devices are aligned, with respect to the plurality of molding devices disposed to be aligned,
    the resin transfer stage includes supplying the resin material moved to one of the side positions for each of the molding devices by the carrying mechanism of the resin transfer unit, and
    the core carrying-in stage and the core carrying-out stage include carrying the core body in and out of each molding device by the core transfer unit arranged at the other of the side positions opposed to said one of the side positions for each of the molding devices.

5. The core unit manufacturing method according to claim 1, wherein
    the molding device is configured from a plurality of molding devices,
    with respect to the plurality of molding devices disposed to be aligned, the core transfer unit includes a sub-transfer mechanism that is capable of moving the core body before being carried into the molding device and after being carried out of the molding device along a direction in which the molding devices are aligned,
    the resin transfer stage includes supplying the resin material to each molding device by the resin transfer unit arranged at said one of the side positions opposed to the other of the side positions for each of the molding device, and
    the core carrying-in stage and the core carrying-out stage include carrying the core body in and out of each molding device at the other of the side positions for each of the molding devices in the sub-transfer mechanism of the core transfer unit.

6. The core unit manufacturing method according to claim 5, further comprising:
    preheating the core body by a preheating device; and
    carrying the preheated core body out of the preheating device, to move the core body to the other of side positions of the molding device, and to carry the core body into the molding device, wherein
    the sub-transfer mechanism of the core transfer unit includes a path for moving the core body before being carried into the molding device, a part of the path being positioned adjacently to the preheating device.

7. The core unit manufacturing method according to claim 1, wherein the resin transfer unit and the core transfer unit are arranged such that the two side positions are at a right angle with respect to the molding device.

8. The core unit manufacturing method according to claim 1, wherein a path through which the resin material is supplied from the resin transfer unit to the molding device and another path through which the core body is carried in and out of the molding device from the core transfer unit are designed without overlapping with each other.

* * * * *